United States Patent
Oteri et al.

(10) Patent No.: US 11,871,414 B2
(45) Date of Patent: Jan. 9, 2024

(54) METHODS AND APPARATUS FOR JOINT MULTI-AP TRANSMISSION IN WLANS

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Li-Hsiang Sun, San Diego, CA (US); Xiaofei Wang, Cedar Grove, NJ (US); Alphan Sahin, Westbury, NY (US); Rui Yang, Greenlawn, NY (US); Frank La Sita, Setauket, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 428 days.

(21) Appl. No.: 17/291,799

(22) PCT Filed: Nov. 8, 2019

(86) PCT No.: PCT/US2019/060441
§ 371 (c)(1),
(2) Date: May 6, 2021

(87) PCT Pub. No.: WO2020/097444
PCT Pub. Date: May 14, 2020

(65) Prior Publication Data
US 2022/0030611 A1 Jan. 27, 2022

Related U.S. Application Data

(60) Provisional application No. 62/815,113, filed on Mar. 7, 2019, provisional application No. 62/757,611, filed on Nov. 8, 2018.

(51) Int. Cl.
*H04W 72/20* (2023.01)
*H04W 84/12* (2009.01)

(52) U.S. Cl.
CPC ............ *H04W 72/20* (2023.01); *H04W 84/12* (2013.01)

(58) Field of Classification Search
CPC .............................. H04W 72/20; H04W 84/12
See application file for complete search history.

(56) References Cited

U.S. PATENT DOCUMENTS 9,485,716 B2  11/2016 Seok
9,967,827 B2   5/2018 Rong et al.
(Continued)

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
(Continued)

*Primary Examiner* — Ricky Q Ngo
*Assistant Examiner* — Stephen N Steiner
(74) *Attorney, Agent, or Firm* — Flaster Greenberg PC

(57) ABSTRACT

A method of multi-access point (multi-AP) communication performed by a wireless transmit/receive unit (WTRU) comprises: receiving (1510) a first trigger frame from a first access point (AP) of a plurality of APs, the first trigger frame comprising first information; receiving (1520) a second trigger frame from a second AP of the plurality of APs at a predetermined time duration after receiving the first trigger frame, the second trigger frame also comprising the first information of the first trigger frame; generating (1530) a synchronization frame based on the first trigger frame and (Continued)

the second trigger frame, the synchronization frame comprising synchronization information; transmitting the synchronization frame to at least the first AP and the second AP; and receiving (1540) a data transmission based on the synchronization information from each of the first AP and the second AP.

16 Claims, 25 Drawing Sheets

(56) References Cited

U.S. PATENT DOCUMENTS

| | | | |
|---|---|---|---|
| 10,015,821 | B2 | 6/2018 | Oteri et al. |
| 2016/0029357 | A1 | 1/2016 | Lv et al. |
| 2016/0044693 | A1 | 2/2016 | Sun et al. |
| 2016/0353357 | A1 | 12/2016 | Asterjadhi et al. |
| 2018/0205434 | A1 | 7/2018 | Cherian et al. |
| 2018/0263043 | A1* | 9/2018 | Zhou ............... H04B 7/024 |
| 2021/0075566 | A1* | 3/2021 | Guo ............... H04W 72/21 |

OTHER PUBLICATIONS

Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax D3.0 (Jun. 2018).
Gidvani et al., "6 GHz operation for 11 ax," IEEE 802.11-18/1607r1 (Sep. 11, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Liu et al., "Discussions on Multi-AP Coordination," IEEE 802.11-18/1509r0 (Aug. 22, 2018).
Montemurro, "EHT TIG Agenda," IEEE 802.11-18/1067r2 (Jul. 10, 2018).
Oteri et al., "Coordinated Multi-AP Transmission for EHT," IEEE 802.11-19/0071r0 (Jan. 13, 2019).
Oteri et al., "Technology Features for 802.11 EHT," IEEE 802.11-18/1547r0 (Sep. 7, 2018).
Park et al., "Multi-AP Transmission Procedure," IEEE 802.11-19/0448r1 (Mar. 11, 2019).
Porat et al., "Constrained Distributed MU-MIMO," IEEE 802.11-18/1439r0 (Sep. 4, 2018).
Srinivasa et al., "AP Coordinated Beamforming for EHT," IEEE 802.11-18/1510r1 (Sep. 10, 2018).
Yang et al., "Considerations on AP Coordination," 802.11-18-1576-01-0eht (Sep. 13, 2018).
Yang et al., "Discussion on EHT Study Group Formation," IEEE 802.11-18/1180r0 (Jul. 9, 2018).

* cited by examiner

AP

BSS Center | Center Group |

BSS Edge | Edge Group, CH1 |   | Edge Group, CH2 |

| Edge Group, CH3 |   | Edge Group, CH4 |

METHODS AND APPARATUS FOR JOINT MULTI-AP TRANSMISSION IN WLANS

CROSS-REFERENCE TO RELATED APPLICATIONS

This application is the U.S. National Stage, under 35 U.S.C. § 371, of International Application No. PCT/US2019/060441 filed Nov. 8, 2019, which claims the benefit of U.S. Provisional Application No. 62/757,611, filed Nov. 8, 2018, and the benefit of U.S. Provisional Application No. 62/815,113, filed Mar. 7, 2019, the contents of which are incorporated herein by reference.

BACKGROUND

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunnelled DLS (TDLS). A WLAN using an Independent BSS (IBSS) mode has no AP, and/or STAs, communicating directly with each other. This mode of communication is referred to as an "ad-hoc" mode of communication.

In downlink coordinated single user (SU) beamforming or joint precoding, methods are needed for the APs to synchronize to the STA such that the signals may reach the STA with similar received power, time, and frequency to enable proper decoding of the signal by the STA. In addition, channel access schemes that enable this operation need to be defined.

SUMMARY

A method of multi-access point (multi-AP) communication performed by a wireless transmit/receive unit (WTRU) comprises receiving a first trigger frame from a first access point (AP) of a plurality of APs, the first trigger frame comprising first information. The WTRU receives a second trigger frame from a second AP of the plurality of APs at a predetermined time duration after receiving the first trigger frame. The second trigger frame also comprises the first information of the first trigger frame. The WTRU generates a synchronization frame based on the first trigger frame and the second trigger frame. The synchronization frame comprises synchronization information. The WTRU transmits the synchronization frame at least the first AP and the second AP. Finally, the WTRU receives a data transmission based on the synchronization information from each of the first AP and the second AP.

A wireless transmit/receive unit (WTRU) configured to perform a multi-access point (multi-AP) communication comprises: a receiver configured to receive a first trigger frame from a first access point (AP) of a plurality of APs. The first trigger frame comprises first information. The receiver is also configured to receive a second trigger frame from a second AP of the plurality of APs at a predetermined time duration after receiving the first trigger frame. The second trigger frame also comprises the first information of the first trigger frame. The WTRU further comprises a processor configured to generate a synchronization frame based on the first trigger frame and the second trigger frame. The synchronization frame comprises synchronization information. The WTRU further comprises a transmitter configured to transmit the synchronization frame to at least the first AP and the second AP. Further, the receiver is configured to receive a data transmission based on the synchronization information from each of the first AP and the second AP.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 illustrates an example trigger frame based downlink (DL) joint transmission;

DETAILED DESCRIPTION

Figure 1A:
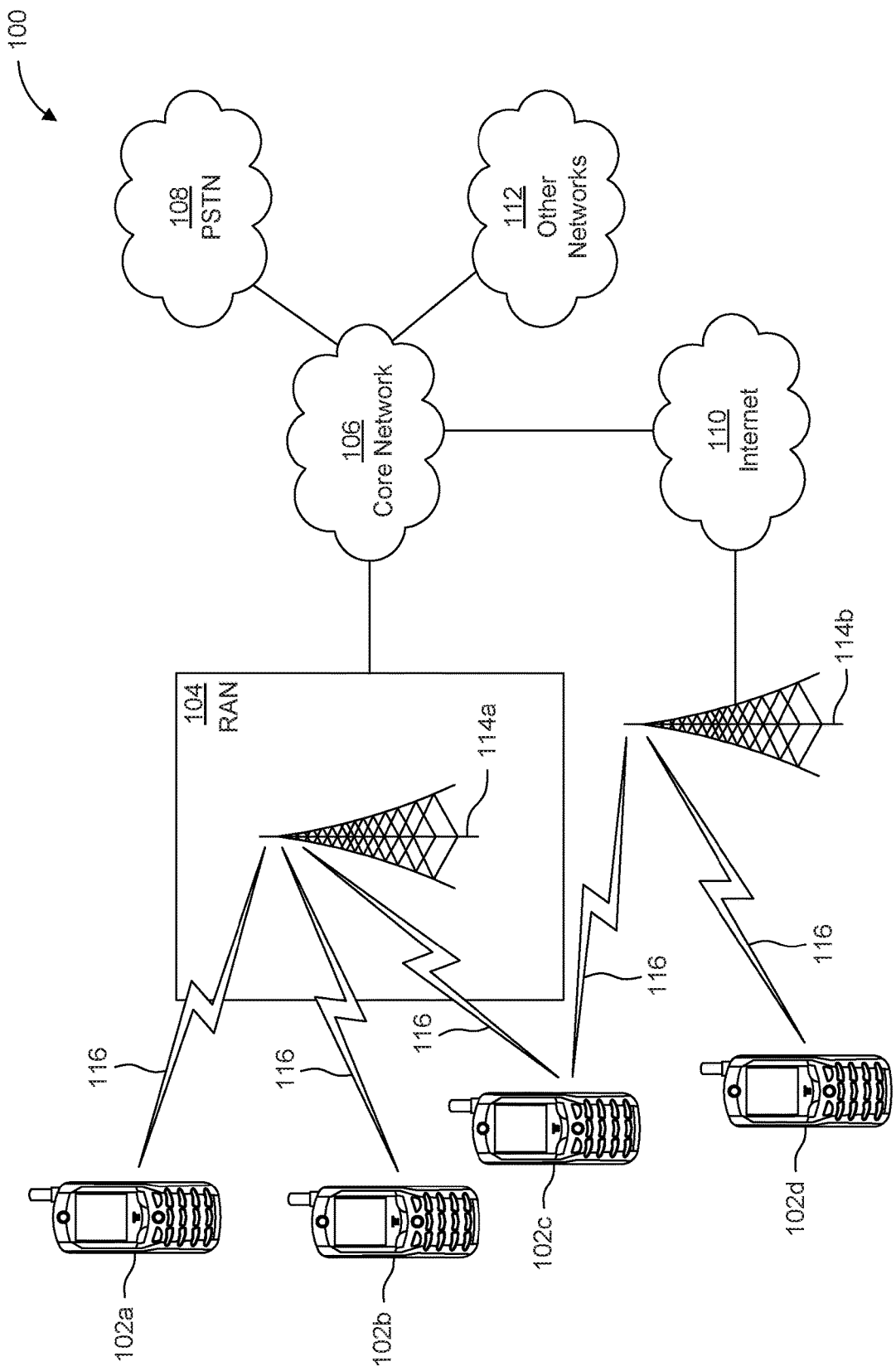
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, anext generation NodeB, such as a gNodeB (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage fora wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
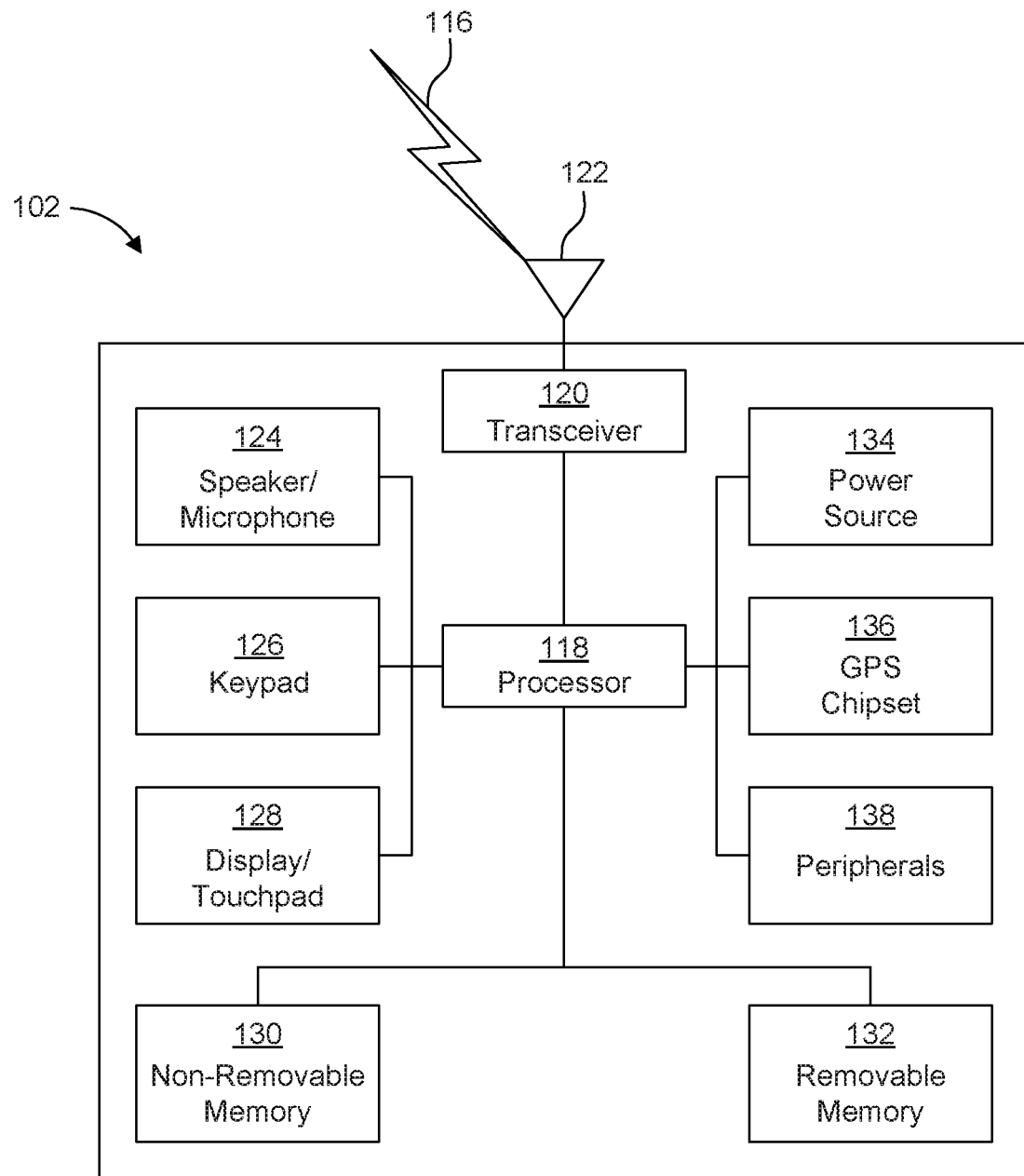
FIG. 1B is a system diagram illustrating an example wireless transmit/receive unit (WTRU) that may be used within the communications system illustrated in FIG. 1A according to an embodiment.
Figure 1C:
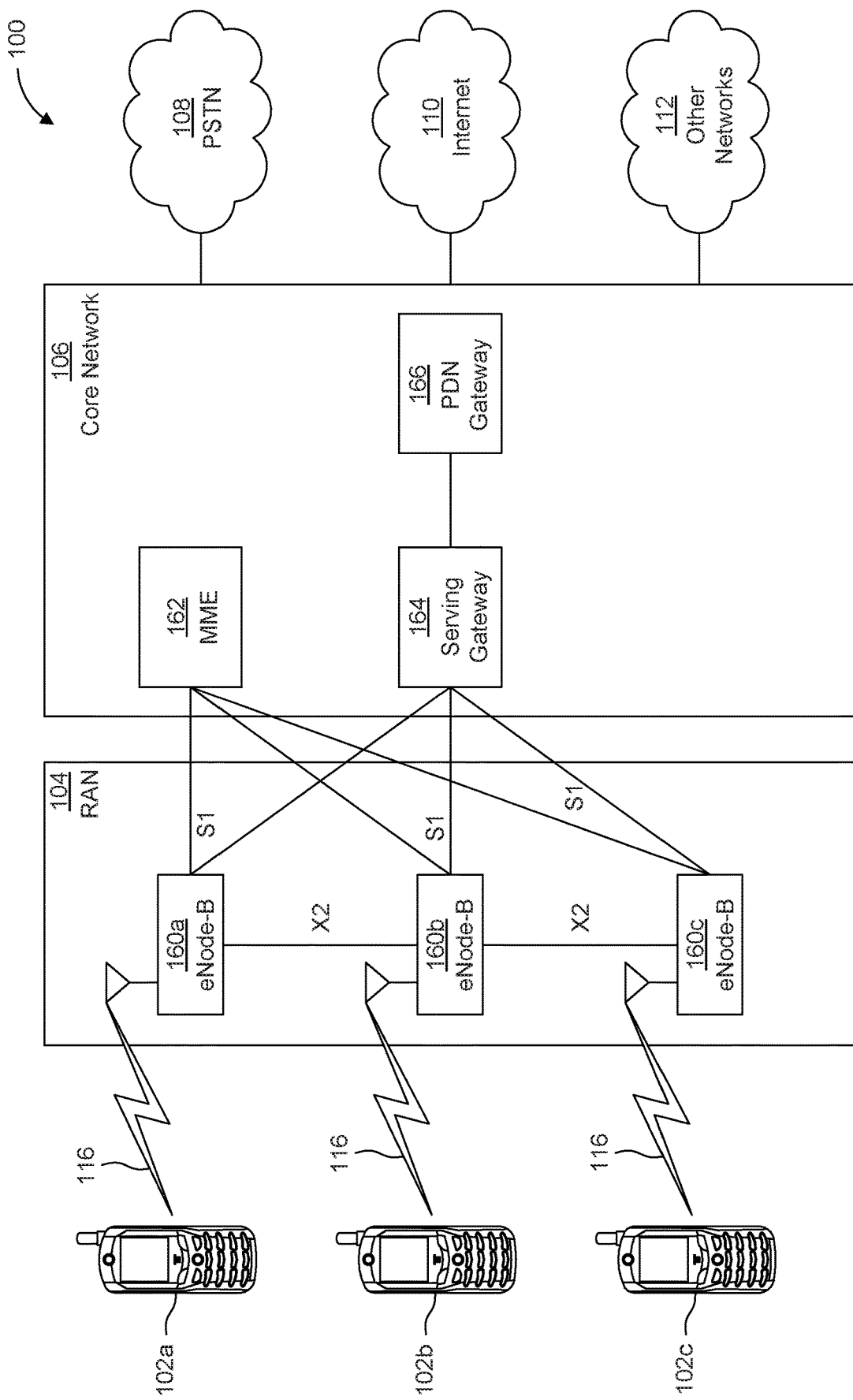
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
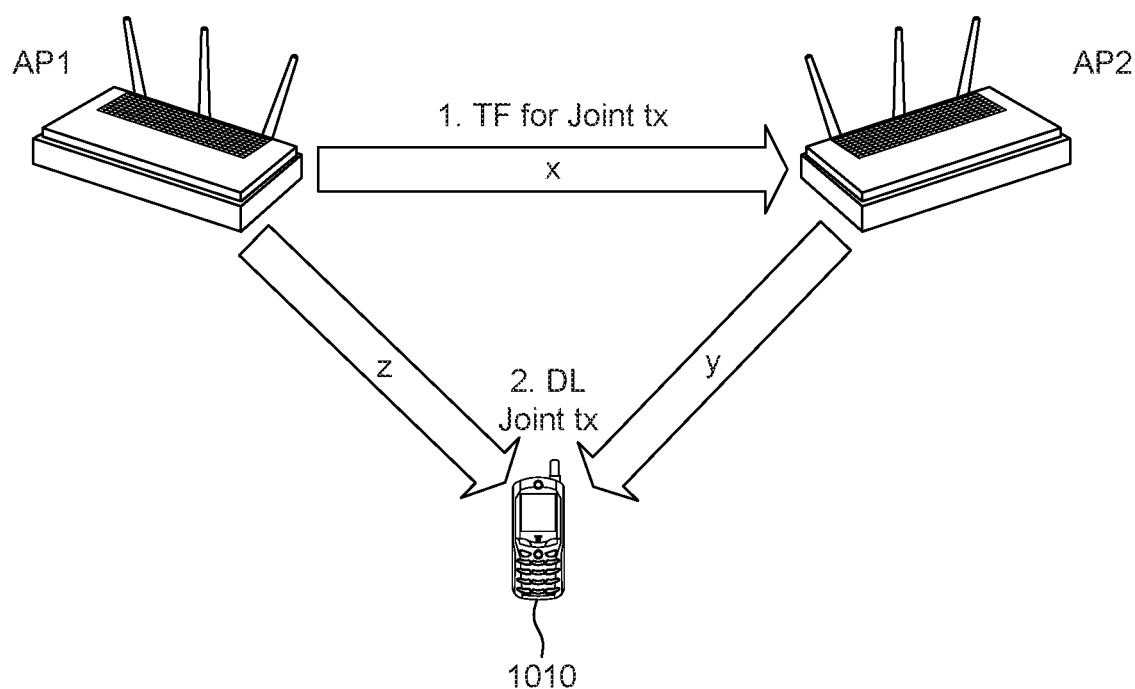
FIG. 10 is a system diagram illustrating an example radio access network (RAN) and an example core network (CN) that may be used within the communications system illustrated in FIG. 1A according to an embodiment.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS), In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
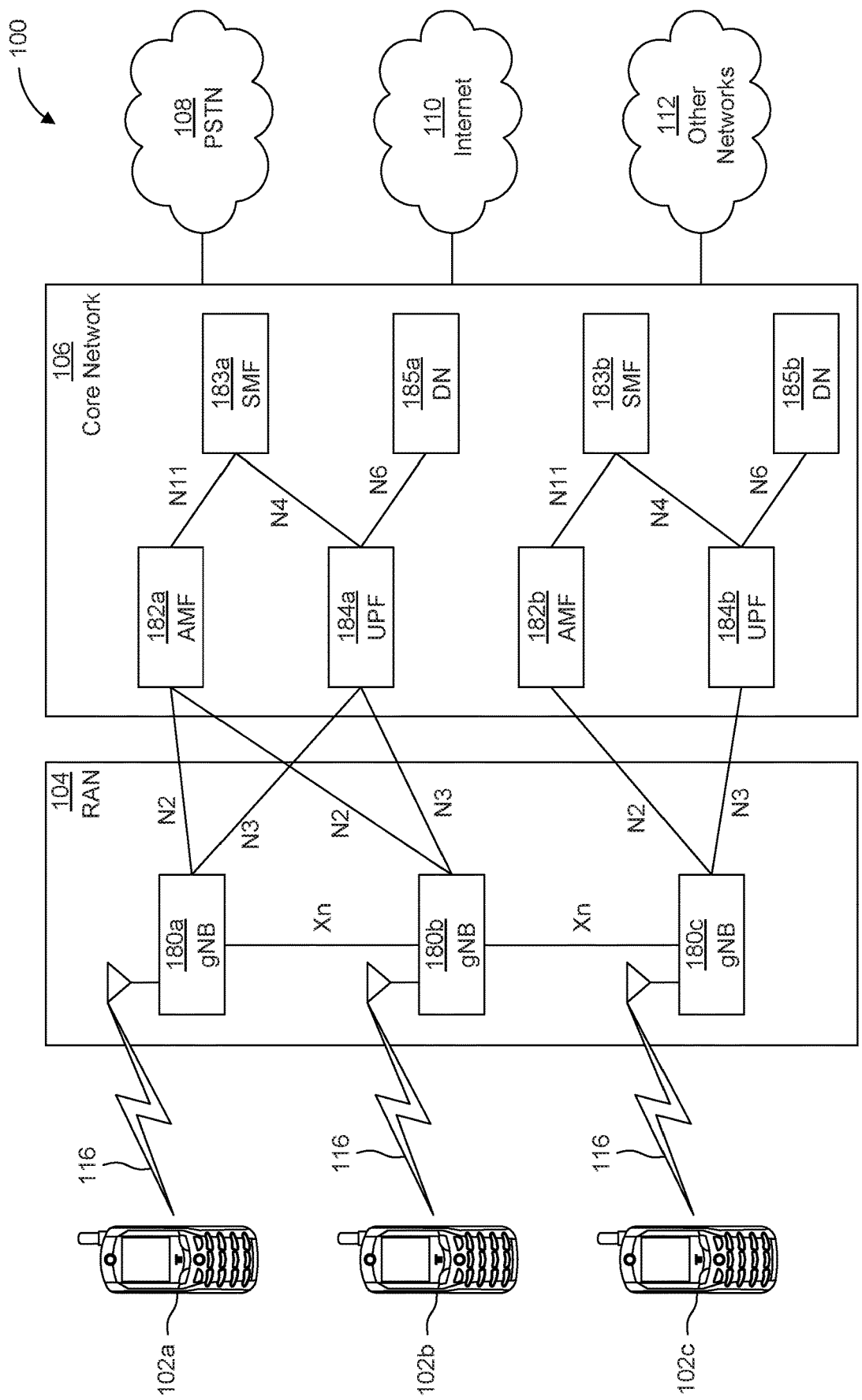

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF

184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless local area network (WLAN) in Infrastructure Basic Service Set (BSS) mode can have an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS can be referred to as peer-to-peer traffic. Such peer-to-peer traffic may also be sent directly between the source and destination STAs with a direct link setup (DLS) using an 802.11e DLS or an 802.11z tunnelled DLS (TDLS). A WLAN in Independent BSS (IBSS) mode has no AP, and STAs, communicate directly with each other. This mode of communication can be referred to as an "ad-hoc" mode of communication.

In some implementations, e.g., systems using the infrastructure mode of operation specified in the Institute of Electrical and Electronics Engineers (IEEE) 802.11ac standard, an AP may transmit a beacon on a fixed channel, usually the primary channel. This channel may be 20 MHz wide, and is the operating channel of the BSS. This channel may also be used by STAs to establish a connection with the AP. Channel access in an 802.11 systems is implemented using Carrier Sense Multiple Access with Collision Avoidance (CSMA/CA). In this mode of operation, every STA, including the AP, can sense the primary channel. If the channel is detected to be busy, the STA backs off. Hence only one STA may transmit at any given time in a given BSS.

In some implementations, e.g., systems complying with the IEEE 802.11n standard, High Throughput (HT) STAs may also use a 40 MHz wide channel for communication. This can be achieved by combining the primary 20 MHz channel, with an adjacent 20 MHz channel to form a 40 MHz wide contiguous channel.

In some implementations, e.g., systems complying with the IEEE 802.11ac standard, Very High Throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described above. A 160 MHz channel may be formed either by combining 8 contiguous 20 MHz channels, or by combining two non-contiguous 80 MHz channels, which may be referred to as an 80+80 configuration. For an 80+80 configuration, the data, after channel encoding, may be passed through a segment parser that divides it into two streams. IFFT, and time domain, processing may be performed on each stream separately. The streams may then be mapped onto the two channels, and the data may be transmitted. At the receiver, this mechanism is reversed, and the combined data is sent to the MAC.

In some implementations, e.g., systems complying with IEEE 802.11af, and/or IEEE 802.11ah standards, Sub 1 GHz modes of operation are supported. In such implementations, the channel operating bandwidths, and carriers, may be reduced relative to those used in systems complying with the IEEE 802.11n and/or IEEE 802.11ac standards. For example, 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control or Machine Type Communications (MTC) devices in a macro coverage area. MTC devices may have limited capabilities such as support for limited bandwidths, and may include a requirement for a very long battery life.

WLAN systems which support multiple channels and/or channel widths, such as those complying with IEEE 802.11n, 802.11ac, 802.11af, and/or 802.11ah standards, may include a channel which is designated as the primary channel. The primary channel may, but not necessarily, have a bandwidth equal to the largest common operating bandwidth supported by all STAs in the BSS. In such cases the bandwidth of the primary channel may therefore be limited by the STA, of all STAs in operating in a BSS, which supports the smallest bandwidth operating mode. In the example of IEEE 802.11ah systems, the primary channel may be 1 MHz wide if the BSS includes STAs (e.g., MTC type devices) that only support a 1 MHz mode even if the AP, and other STAs in the BSS, may support a 2 MHz, 4 MHz, 8 MHz, 16 MHz, or other channel bandwidth operating modes. Carrier sensing and NAV settings may depend on the status of the primary channel. In some such cases, if the primary channel is busy, e.g., due to a STA supporting only a 1 MHz operating mode is transmitting to the AP, then the entire available frequency bands are considered busy even though majority of it stays idle and available.

In the United States, the available frequency bands which may be used by 802.11ah compliant systems are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

Recently, the IEEE 802.11 High Efficiency WLAN (HEW) Study Group (SG) was created to explore the scope and purpose of a possible, future amendment to enhance the quality of service all users experience for a broad spectrum of wireless users in many usage scenarios including high-density scenarios in the 2.4 GHz, 5 GHz and 6 GHz band. New use cases which support dense deployments of APs, and STAs, and associated Radio Resource Management (RRM) technologies are being considered by the HEW SG.

In a typical 802.11 network (i.e., a network complying with one or more IEEE 802.11 standards), STAs are associated with a single AP and can transmit to and from that AP with little or no coordination with transmissions in neighboring BSSs. A STA may defer to an overlapping BSS (OBSS) transmission based on a CSMA protocol that is entirely independent between BSSs. In some systems (e.g., 802.11ax compliant systems), some level of coordination between OBSSs can be implemented using spatial re-use procedures to allow OBSS transmissions based on an adjusted energy detection threshold (e.g., using an OBSS packet detection (OBSS PD) procedure) or by knowledge of the amount of interference that could be tolerated by a receiving OBSS STA (e.g., using a spatial reuse parameter (SRP) procedure).

Some implementations include procedures to allow for more coordination between the OBSSs by allowing transmission to or from multiple APs to a single or multiple STAs. In some implementations, this is similar to Coordinated Multi-point (CoMP) transmission in systems complying with 3GPP LTE Release 10, but in some implementations, such procedures work within an unlicensed band and/or are specific to one or more IEEE 802.11 protocols.

In systems supporting Coordinated multi-point (CoMP) transmission, multiple eNBs (or other types of base stations—eNB is used for convenience) may transmit to the same or multiple WTRUs in the same time and frequency resource using joint processing/transmission. This can have the effect of improving overall throughput for the considered WTRU. Dynamic cell selection may be treated as a special case of joint processing in which only one of the set of WTRUs is actively transmitting data at any time. On the other hand, multiple eNBs may transmit to different WTRUs (each eNB serving its own WTRU) in the same time and frequency resource using coordinated beamforming/scheduling. This can have the effect of reducing interference experienced by each WTRU. Significant improvements of cell average and/or cell edge throughput may be achieved using CoMP, e.g., in LTE systems. In some implementations, multiple transmit antennas are assumed available for each base station. Simultaneous interference suppression (for other WTRUss) and signal quality optimization (for the desired WTRU) may be performed using spatial domain signal processing at each base station.

In some implementations, some degree of channel state information is assumed available at the base stations, e.g., through explicit feedback. Further, in some implementations, some degree of timing/frequency synchronization is assumed, e.g., to avoid more complicated signal processing to deal with inter-carrier interference (or inter-symbol interference). Further, in some implementations, the level of coordination between the eNBs may affect the specific CoMP scheme that may be possible.

Multi-AP transmission schemes in WLANs may be referred to using several classifications, including Coordinated OFDMA, Coordinated Nulling/Beamforming, and Coordinated SU/MU Transmission.

In coordinated OFDMA, each group of RUs may be used by one AP only to transmit or receive data. The information may be beamformed or may include MU-MIMO on each RU. Complexity can be described as relatively low to moderate. In some simple coordinated OFDMA schemes, the APs may divide the OFDMA RUs among themselves in a coordinated manner, with each AP restricted to specific RUs. In some more sophisticated coordinated OFDMA scheme, the APs allow STAs that are not affected by interference or will not affect others to utilize the entire bandwidth while restricting access for the STAs that may be affected. This approach may be referred to as fractional frequency reuse (FFR).

Figure 2:
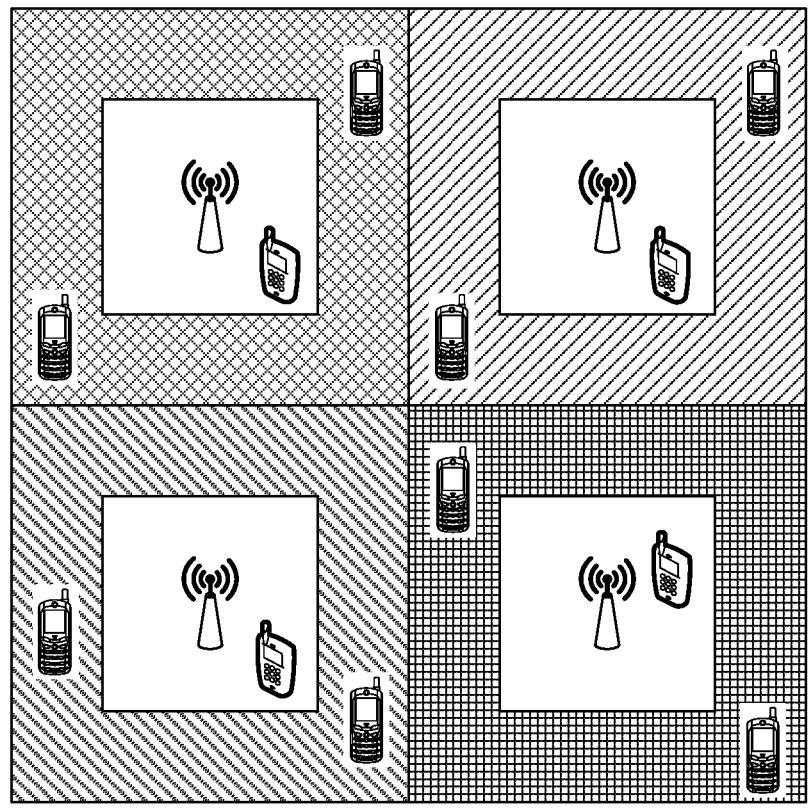
FIG. 2 illustrates a fractional frequency reuse (FFR) in coordinated Orthogonal Frequency-Division Multiple Access (OFDMA)
Figure 2:
Figure 2:
Figure 2:

FIG. 2 illustrates FFR in coordinated OFDMA. The center group may use all the channels where the edge groups may use different channels.

Figure 3:
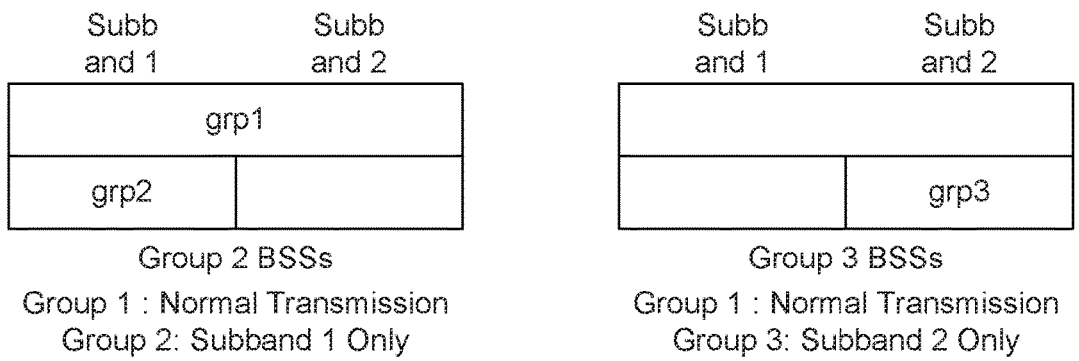
FIG. 3 illustrates an associated OFDMA resource allocation for the example of FIG. 2.

FIG. 3 illustrates an associated OFDMA resource allocation for the example of FIG. 2. In this example, group 1 may use both subband 1 and subband 2. Group 2 may use subband 1 and Group 3 may use subband 2. In Coordinated Nulling/Beamforming (CN/CB), each AP may apply precoding to transmit information to or from its desired STA(s) and may suppress interference to or from other STA(s).

Figure 4:
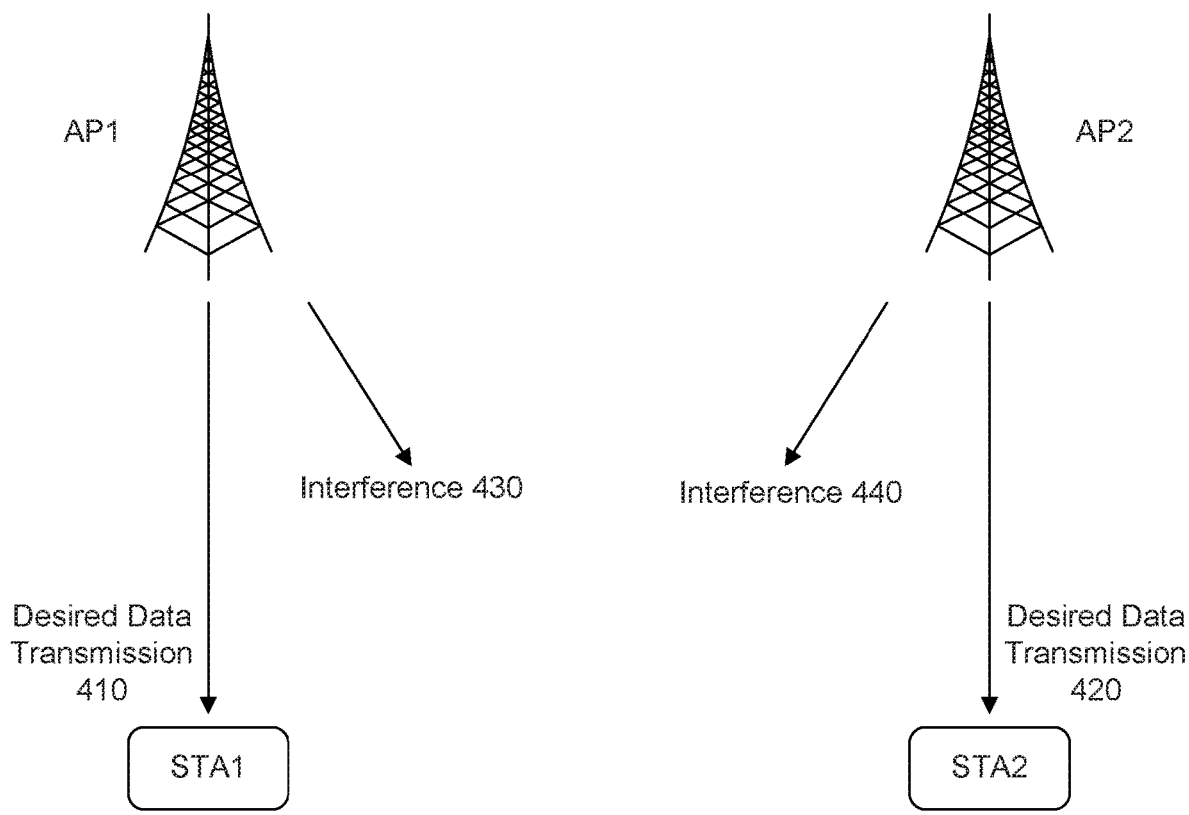
FIG. 4 illustrates example coordinated nulling/beamforming.

FIG. 4 illustrates example CN/CB. As shown in FIG. 4, there are an AP2 and a STA1. A data transmission between the AP1 and the STA1 is a desired data transmission 410. There are also an AP2 and a STA1. A data transmission between the AP2 and the STA2 is a desired data transmission 420. However, in this scenario, the AP1 might also transmit data to another STA or other STAs, and thus there may be an interference data transmission, i.e., an interference 430. The AP2 might also transmit data to another STA or other STAs, and thus there may be an interference data transmission, i.e., an interference 440. In some such cases, the data for each STA is only needed at its associated AP although channel information from the other STA may be needed at both APs.

In coordinated single user (SU) or multi user (MU) transmission, multiple APs may coordinate to transmit information to or from a single STA or multiple GSTAs simultaneously. In some such cases, both the channel information and the data for the STA(s) are needed at both APs. It may be a Coordinated SU Transmission.

In the Coordinated SU Transmission: multiple APs transmit to a STA in one RU. The Coordinated SU transmission may include, in order of increased complexity, either Dynamic Point Selection, Coordinated SU Beamforming or Joint Precoding.

Figure 5:
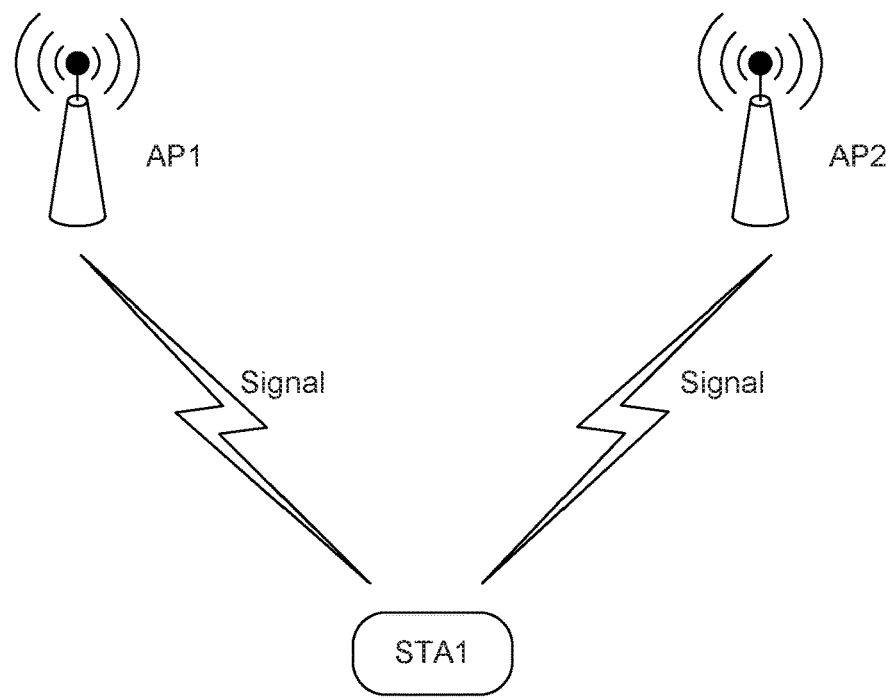
FIG. 5 illustrates a single-user joint precoded multi-AP transmission.

FIG. 5 illustrates single-user joint precoded multi-AP transmission or coordinated SU beamforming. As shown in FIG. 5, in Dynamic Point Selection, the transmission may be dynamically selected from one of the set of APs. In some such implementations, this selection may incorporate HARQ. In Coordinated SU Beamforming or Joint Precoding, the transmission may be from the plurality of APs simultaneously, and the transmission may be beamformed or precoded to the desired STA on one or more RUs. As shown in FIG. 5, both AP1 and AP2 may do transmission to a STA, i.e., STA1.

Figure 6:
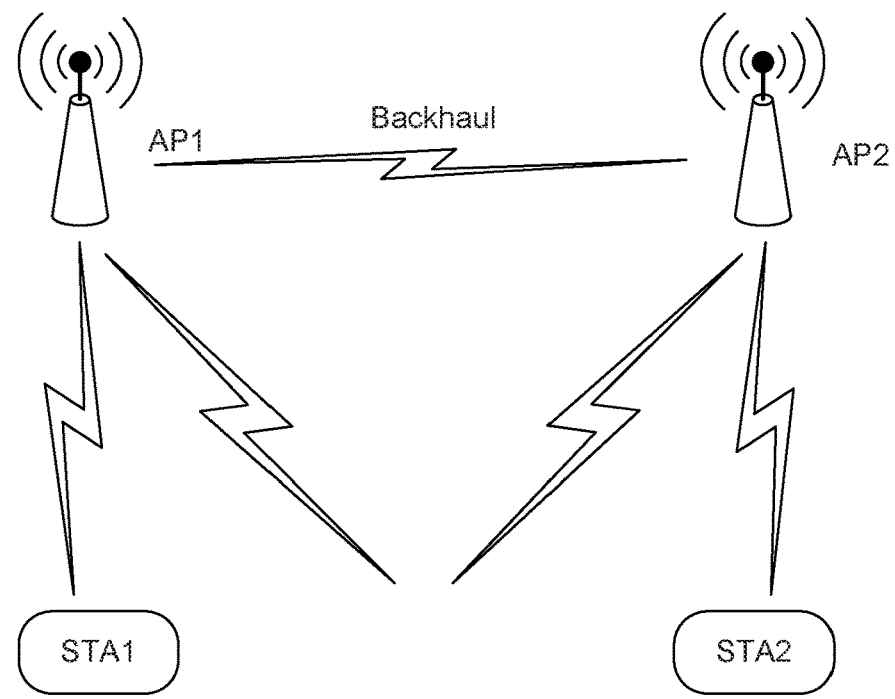
FIG. 6 illustrates a multi-user joint precoded Multi-AP transmission.

FIG. 6 illustrates a multi-user joint precoded Multi-AP transmission or Coordinated MU Beamforming. In Coordinated MU Beamforming, multiple APs transmit or receive data to/from multiple STAs on one or more RUs. As shown in FIG. 6, there are two APs (i.e., AP1 and AP2) and two STAs (i.e., STA1 and STA2). AP1 may transmit data to STA1, and AP2 may transmit data to STA2. Meanwhile, AP1 may also transmit data to a STA other than STA1, and AP2 may also transmit data to a STA other than STA2. Further, there may be a wireless backhaul in which a trigger frame (TF) is sent from AP1 to AP2.

Various techniques discussed herein relate to Joint Multi-AP Transmission. Various Multi-AP schemes may be considered for EHT applications, including coordinated beamforming and joint processing.

Some implementations address synchronization between multiple APs for the phase calculation in UL sounding/channel estimation. For DL MIMO channel estimation with increasingly large numbers of antennas, the amount of feedback and quantization errors may make DL sounding undesirable. Assuming channel reciprocity, in some implementations, an UL sounding can be used to replace DL sounding for the purpose of DL MIMO transmission. In some implementations, for UL sounding to a single AP, no feedback is needed from a non-AP STA. In some implementations, for UL sounding to multiple APs, only feedback of a partial channel (channel observed at a slave AP) is needed.

In a DL sounding procedure, in some implementations, a non-AP STA is the entity measuring the signal and/or estimating the channel. The non-AP STA in this case has perfect knowledge of received signal phase differences between Rx antennas at the non-AP STA. However, in UL sounding with multiple APs, APs do not have a common reference clock. When estimated channels from multiple APs are combined, the phase difference between channels measured by different APs are not known in some implementations.

In the following example, which illustrates the multi-AP UL sounding problem, the following are assumed: (1) the master AP performs its own channel estimation and the slave APs' channel estimations; (2) the master AP performs precoder calculations and informs the precoder corresponding to slave AP's antennas, using a frame (referred to as frame A) such as a trigger frame (TF); (3) an inter-frame spacing (IFS) after transmitting frame A, the master AP begins joint transmission; (4) an IFS after receiving frame A, the slave AP begins joint transmission.

Figure 7:
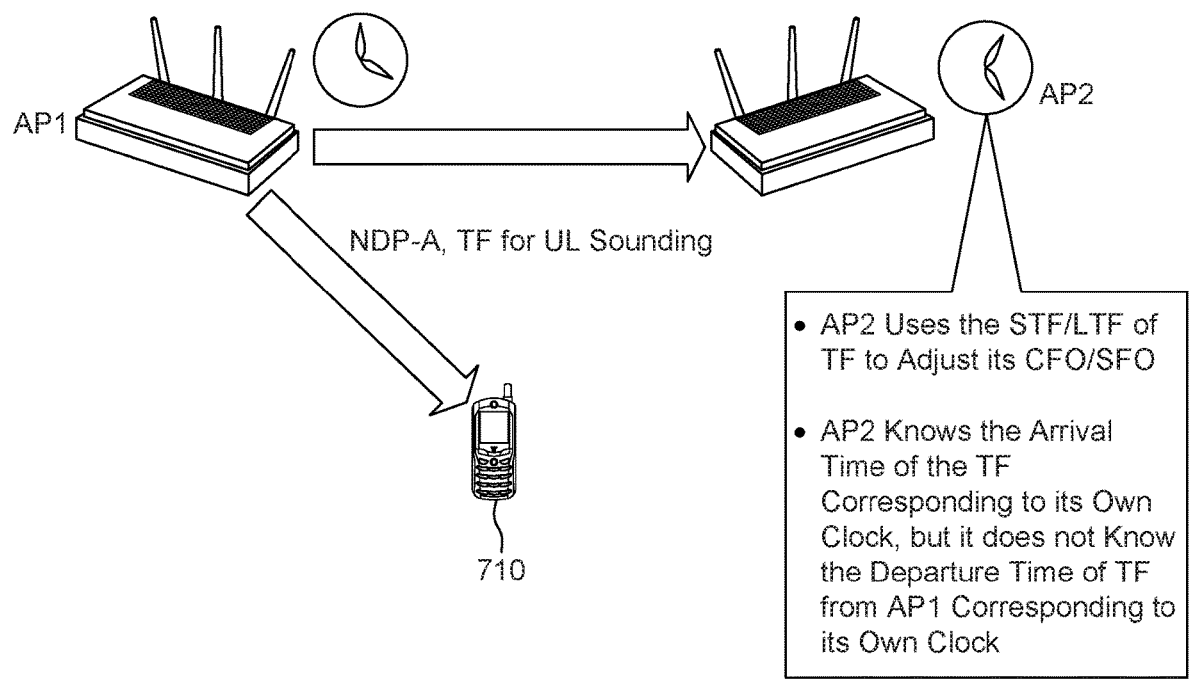
FIG. 7 illustrates example trigger-based multi-AP sounding.

FIG. 7 illustrates example trigger-based multi-AP sounding. In FIG. 7, a master AP (i.e., AP1) will transmit data to a WTRU 710. AP1 may initiate UL sounding by sending a null data packet (NDP) Announcement (NDP-A) and trigger frame (TF) for UL sounding. After receiving the TF, a slave AP (i.e., AP2 or a non-AP STA) adjusts its oscillator such that carrier frequency offset (CFO) and/or sampling frequency offset (SFO) are corrected relative to AP1. Although the oscillator frequency is aligned, AP2 still does not know the clock at AP1 corresponding to its own clock in this example.

Figure 8:
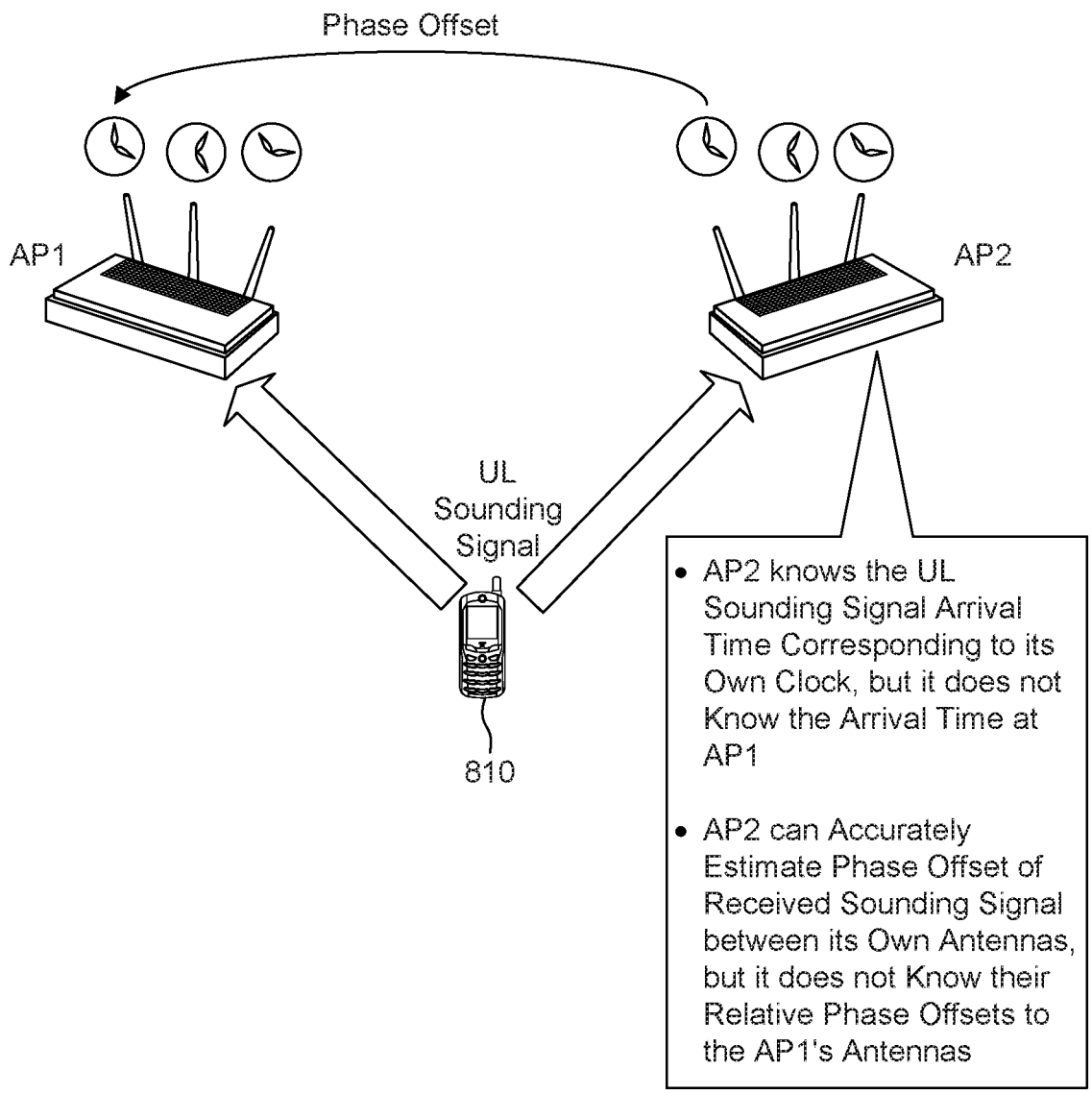
FIG. 8 illustrates an example uplink (UL) sounding phase offset.

FIG. 8 illustrates an example UL sounding phase offset. As shown in FIG. 8, a WTRU 810 transmits UL sounding signal to AP1 and AP2. Then, the sounding signal is received at AP2. AP2 is able to estimate the channel amplitude and phases between its own antennas and the transmitting non-AP STA. Assuming a wireless backhaul in which a TF is sent from AP1 to AP2, the channel observed at AP2 can then be reported back to AP1. However, in some implementations AP1 would not be able to combine this information with its own channel estimation because it has performed channel estimation at a time that is potentially slightly different, which may result in a phase offset between AP1 and AP2's estimated channels.

In some implementations, to avoid this phase offset problem, the AP1 would need information regarding the time that AP2 performed channel estimation with respect to AP1s clock. In some implementations, this would require clock synchronization between the master and slave AP in addition to CFO/SFO correction. It may be desired to provide systems and methods where no clock synchronization is needed between master/slave APs for the purpose of channel estimation and joint DL transmission.

Some implementations address Downlink Coordinated SU Beamforming or Joint Precoding. In downlink Coordinated SU Beamforming or Joint Precoding, it may be desired to provide methods, systems, and devices for the APs to synchronize to a STA such that the signals reach the STA with similar received powers, times and frequencies, e.g., to enable proper decoding of the signal by the STA. Further, it may be desired to define corresponding channel access schemes.

Some implementations address Uplink Coordinated SU Beamforming or Joint Precoding. In some implementations, transmission from a single STA to a single AP is supported. In uplink Coordinated SU Beamforming or Joint Precoding or dynamic AP selection, it may be desired to provide channel access methods for the STA to send signals to one or more APs.

Some implementations address Coordinated MU beamforming. In coordinated MU beamforming, several example scenarios may occur.

In a first example, APs may have vastly different impairments/configurations. For example, the APs may have different transmit powers and/or error vector magnitudes (EVM). In such cases, it may be desired to balance the transmit powers, e.g., to enable inversion of the effective channel for MU-transmission. In a case where the APs have different transmit powers to the STAs, the resulting effective channel may not be invertible (e.g., the effective channel may have a high condition number).

Figure 9:
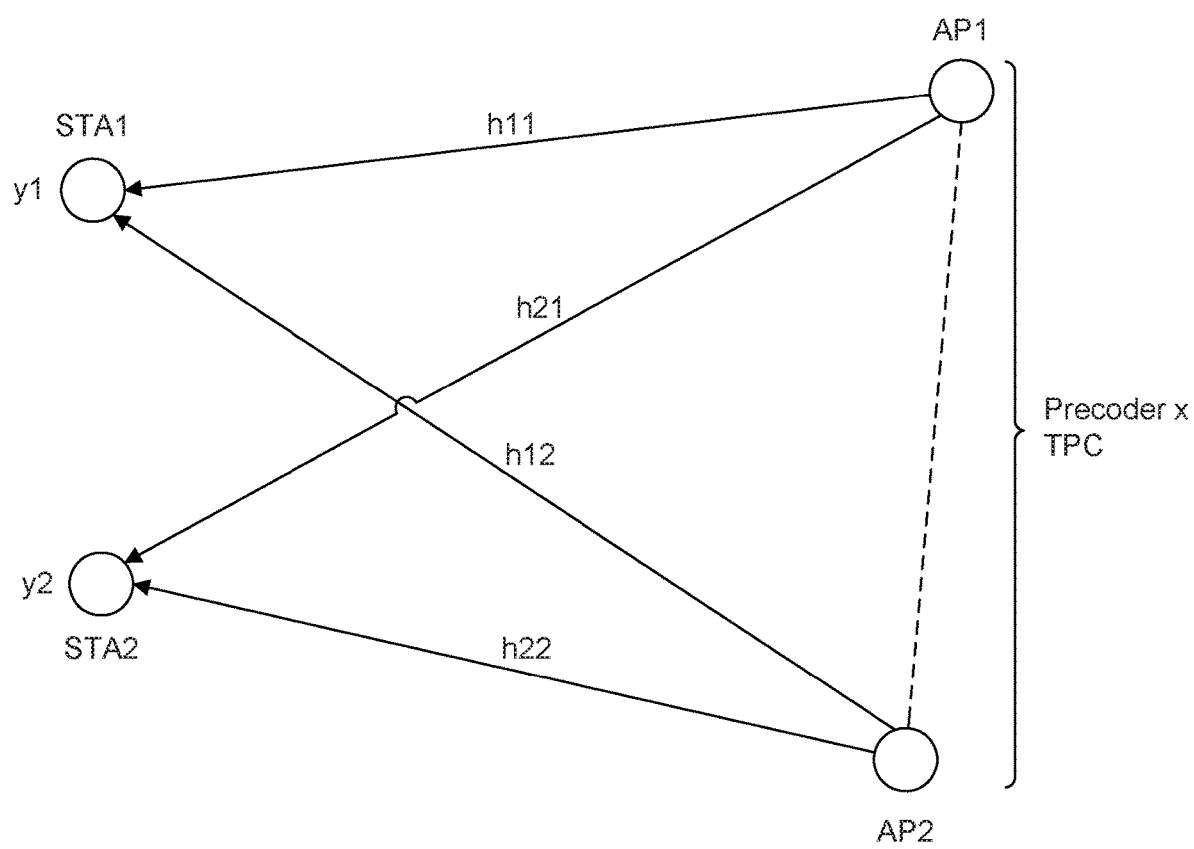
FIG. 9 illustrates an example of coordinated MU beamforming.

FIG. 9 illustrates an example of coordinated MU beamforming. In this example, the received signal at each STA $\{y1, y2\}$ may be modeled as:

$$\begin{bmatrix} y1 \\ y2 \end{bmatrix} = \begin{bmatrix} h11 & h12 \\ h21 & h22 \end{bmatrix} \begin{bmatrix} a & b \\ c & d \end{bmatrix} \begin{bmatrix} e & 0 \\ 0 & f \end{bmatrix} \begin{bmatrix} x1 \\ x2 \end{bmatrix}$$

where $[y1\ y2]'$ are the received signals, $h\_\{i,j\}$ are the effective channels from APi to STA j, $[a\ b;\ c\ d]$ is the precoding matrix, $[e, 0; 0; f]$ represents any baseband scaling done at the AP and x1 and x2 are the transmitted signals to STA 1 and STA 2 respectively.

In cases where the APs have different transmit powers to the STAs, the effective channel may be modeled as:

$$\begin{bmatrix} h11 & h12 \\ h21 & h22 \end{bmatrix} = \begin{bmatrix} v\tilde{h}11 & w\tilde{h}12 \\ v\tilde{h}21 & w\tilde{h}22 \end{bmatrix} = \begin{bmatrix} \tilde{h}11 & \tilde{h}12 \\ \tilde{h}21 & \tilde{h}22 \end{bmatrix} \begin{bmatrix} v & 0 \\ 0 & w \end{bmatrix}$$

where v and w are the effect of each APs power on the effective channel. To invert the channel for a ZF precoder, the effective channel may be inverted as:

$$inv\left(\begin{bmatrix} h11 & h12 \\ h21 & h22 \end{bmatrix}\right) = inv\left(\begin{bmatrix} v & 0 \\ 0 & w \end{bmatrix}\right) inv\left(\begin{bmatrix} \tilde{h}11 & \tilde{h}12 \\ \tilde{h}21 & \tilde{h}22 \end{bmatrix}\right)$$

If there is a large power imbalance in the APs (e.g., v>>w), then the resulting channel may have a high condition number and inverting the channel may be problematic.

Some implementations provide UL sounding and channel estimation from multiple APs without clock synchronization. Such examples may address issues relating to synchronization between multiple APs for phase calculation in UL sounding and/or channel estimation.

FIG. 10 illustrates example trigger frame based DL joint transmission based on the steps discussed above. As shown in FIG. 10, AP1 transmits a trigger frame (TF) to AP2, and AP1 and AP2 transmit data to a WTRU 1010 respectively. In this example, the DL signal from AP1 arrives (x+y)−z before the DL signal from AP2, at the non-AP STA. Here, x,y,z corresponds to the propagation delays in each of the signals in FIG. 10.

In some implementations, the master AP does not need to know x, y and z individually to combine the channel estimated by itself and slave Aps; rather, in such implementations the master AP needs only to know the value of Δt=(x+y)−z.

For example, in some implementations the AP can combine the channel estimations as follows:

$$H=[H_{AP1}e^{2\pi f \Delta t}H_{AP2}],$$

or, $$H=[H_{AP1}H_{AP2}e^{-2\pi f \Delta t}],$$

where $H_{AP1}$ and $H_{AP2}$ correspond to the estimated channels at AP1 and AP2. In this case, the master AP can the use H to perform precoding.

Alternatively, in some implementations the master AP can use:

$$H=[H_{AP1}H_{AP2}].$$

as the combined channel to calculate a precoder. However, in this case the AP1 can delay its DL joint transmission (e.g., until IFS+Δt after transmitting TF, or until it instructs slave AP to advance its transmission, e.g., IFS−Δt after receiving TF). Such delay adjustments may be dependent on subcarrier frequencies.

In some implementations, Δt can be acquired by the master AP based on the time difference between the time the master AP receives the start/end of a frame B, (e.g., a sounding feedback, or other frame from slave AP), and when the master AP receives the start and/or end of the UL sounding signal from the non-AP STA, minus a fixed delay D, where D is a known delay between the time the slave AP receives the start of UL signal, and the time the slave AP starts to transmit frame B. Some adjustments can also be made to frame length difference between frame B and the sounding signal, e.g., if the end of the frame is used to calculate the difference.

Figure 11:
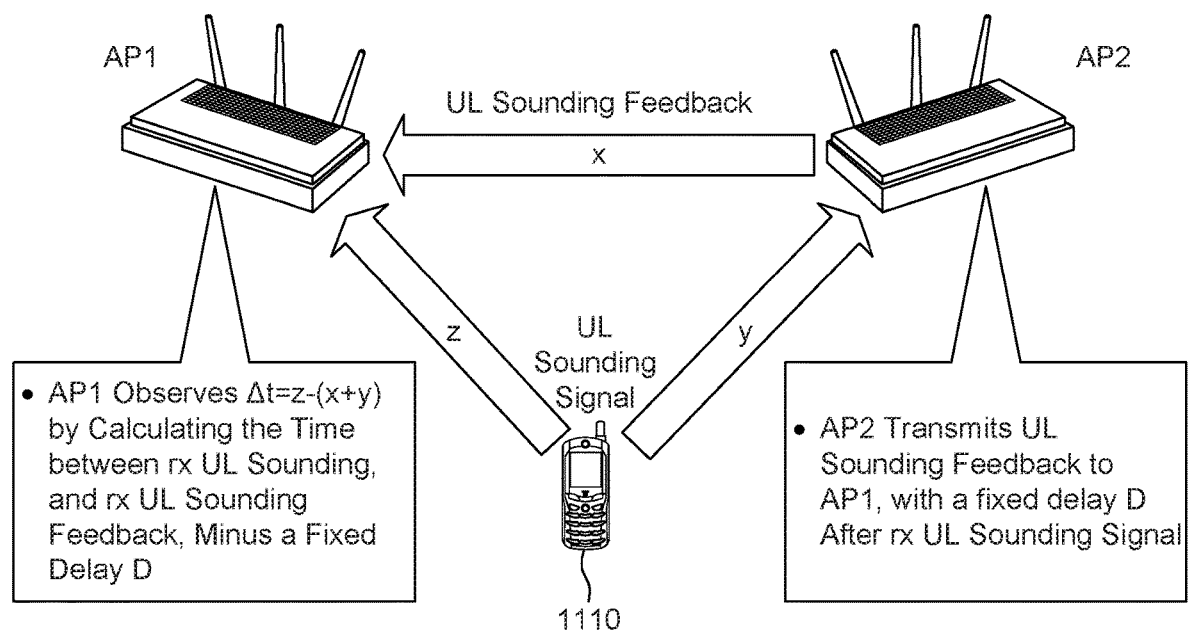
FIG. 11 illustrates an exemplary channel access procedure.

FIG. 11 illustrates this UL sounding scenario. As shown in FIG. 11, a WTRU 1110 may transmit a UL sound signal to AP1 and AP2 respectively. AP1 may observes Δt=z−(x+y) by calculating the time between rx UL sounding, and rx UL sounding feedback, minus a fixed delay D. AP2 transmits UL sound feedback to AP1, with a fixed delay D after rx UL sounding signal.

If multiple non-AP STAs perform UL sounding simultaneously, this example scenario can be applied using one STA and one AP1/AP2 antenna pair as a reference, such that the Δt is calculated using this reference antenna pairs. Although different STAs may have different Δt, the phase difference between $H_{AP1}$ and $H_{AP2}$ may be adjusted automatically e.g., because the same entity (AP1 or AP2) was observing/estimating multiple STAs.

In some implementations, if multiple non-AP STAs perform UL sounding simultaneously, the procedures described above may be performed independently for each non-AP STA.

Some implementations provide channel access with synchronization for DL coordinated SU and MU beamforming. Such examples may address issues relating to DL coordinated SU beamforming or joint precoding discussed earlier. In an example scenario where both AP1 and AP2 transmit concurrently to a STA, the APs may need to synchronize with the STA such that the signals reach the STA with similar received power. Synchronization in time and frequency may also be needed in some implementations. Accordingly, various techniques discussed with respect to FIG. 12 may be used to synchronize the transmissions from multiple APs in some implementations.

Figure 12:
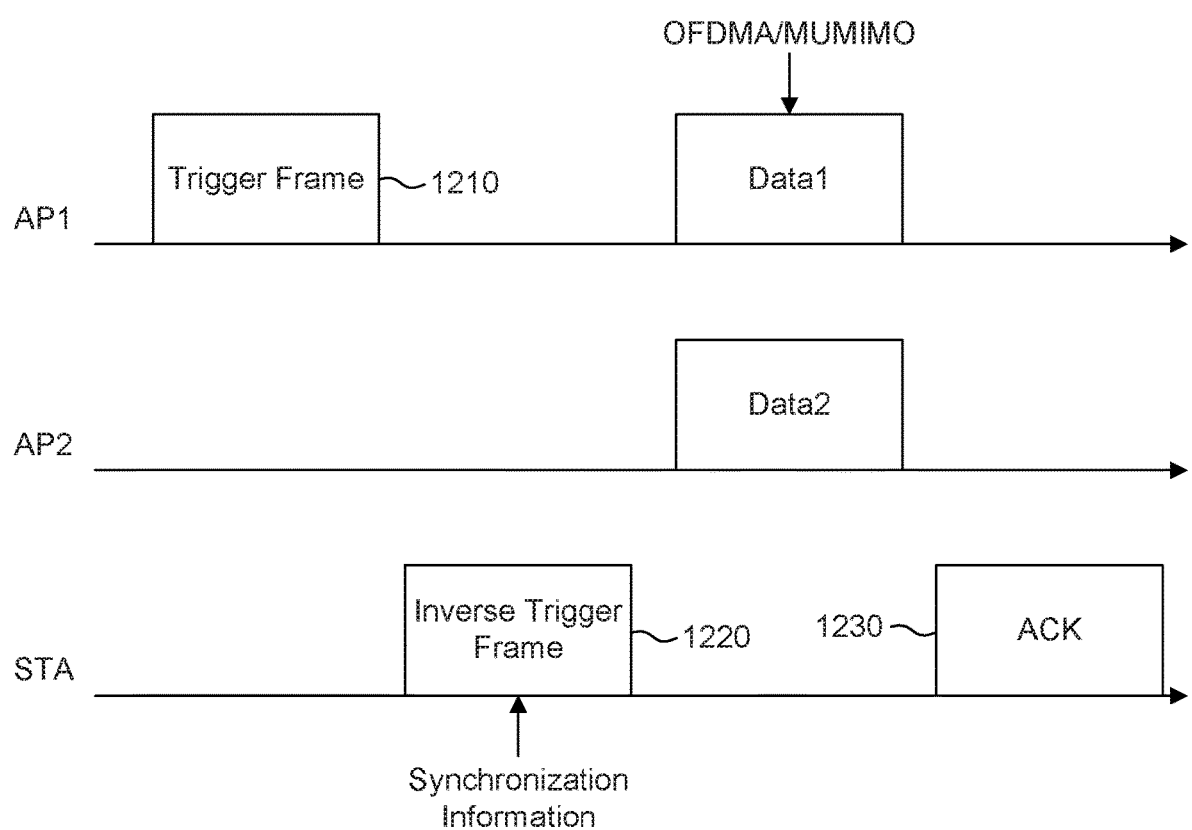
FIG. 12 illustrates an exemplary channel access procedure.

FIG. 12 shows an exemplary channel access procedure which may allow multiple APs to transmit to a STA concurrently. In the example of FIG. 12, AP1 and AP2 may negotiate to perform concurrent transmission to a STA. In some examples, in the negotiation, AP1 may be considered as the primary AP, and AP2 may be considered as the secondary AP. In some implementations, the AP1 and AP2 may perform multi-AP joint transmission sounding in advance or instantaneously to acquire channel state information.

As shown in FIG. 12, AP1 may acquire the channel and may transmit a multi-AP Trigger frame (i.e., trigger frame 1210) to trigger a transmission to a STA. AP1 may configure the upcoming multi-AP transmission in the multi-AP Trigger frame. In some implementations AP1, the primary AP, may configure the transmission from AP2 to the STA. The multi-AP trigger frame may indicate, for example, STA specific information, and/or common information. STA specific information (where STA here indicates an AP STA or a non-AP STA) may indicate a STA role and/or STA ID. The STA role may indicate whether the STA is a transmitter/AP or a receiver/STA. The STA ID may be the association identifier (AID), compressed AID, BSS identifier (BSSID, compressed BSSID), BSS color, or enhanced BSS color, etc.

If the STA role indicates a transmitter/AP, it may include a packet ID, resource allocation, spatial stream allocation, or MCS-related information. A packet ID may be used to indicate the packet transmitted from the STA. In some implementations, this field may be an AP/transmitter specific field. The STA may detect the packet IDs corresponding to multiple APs and determine whether a single packet is transmitted from multiple APs or multiple packets are transmitted from multiple APs. In the first case, the STA may combine the transmissions from multiple APs to decode the single packet. A resource allocation may be used to indicate the resources allocated to the AP to transmit the multi-AP packet. In an OFDMA transmission scenario, the resource may be allocated in units of resource unit (RU). A spatial stream allocation may be used to indicate the starting spatial stream index and number of spatial streams used for the transmitter. MCS-related information this may include MCS, coding scheme, whether DCM modulation is utilized etc.

Common information may include a type field. The type may indicate a DL multi-AP transmission. The type may indicate a trigger frame transmitted from an AP.

Figure 15:
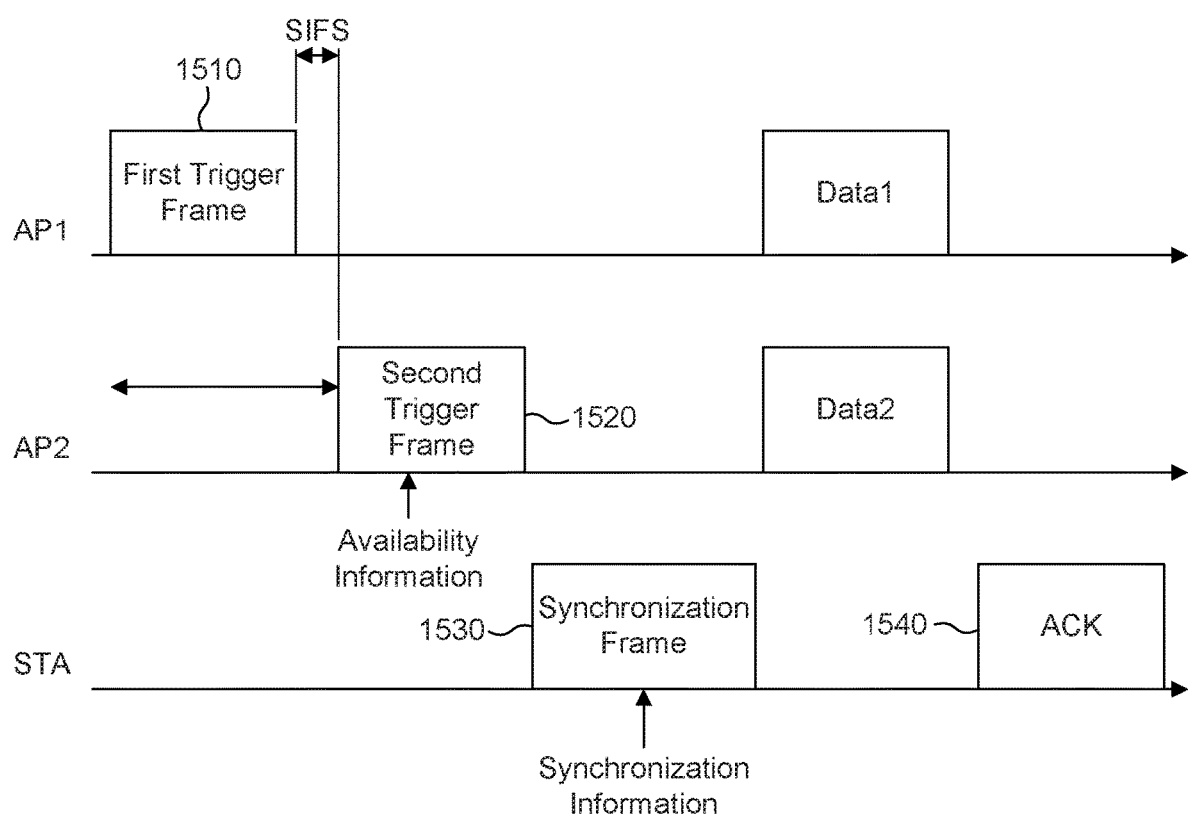
FIG. 15 illustrates an exemplary channel access procedure.
Figure 16:
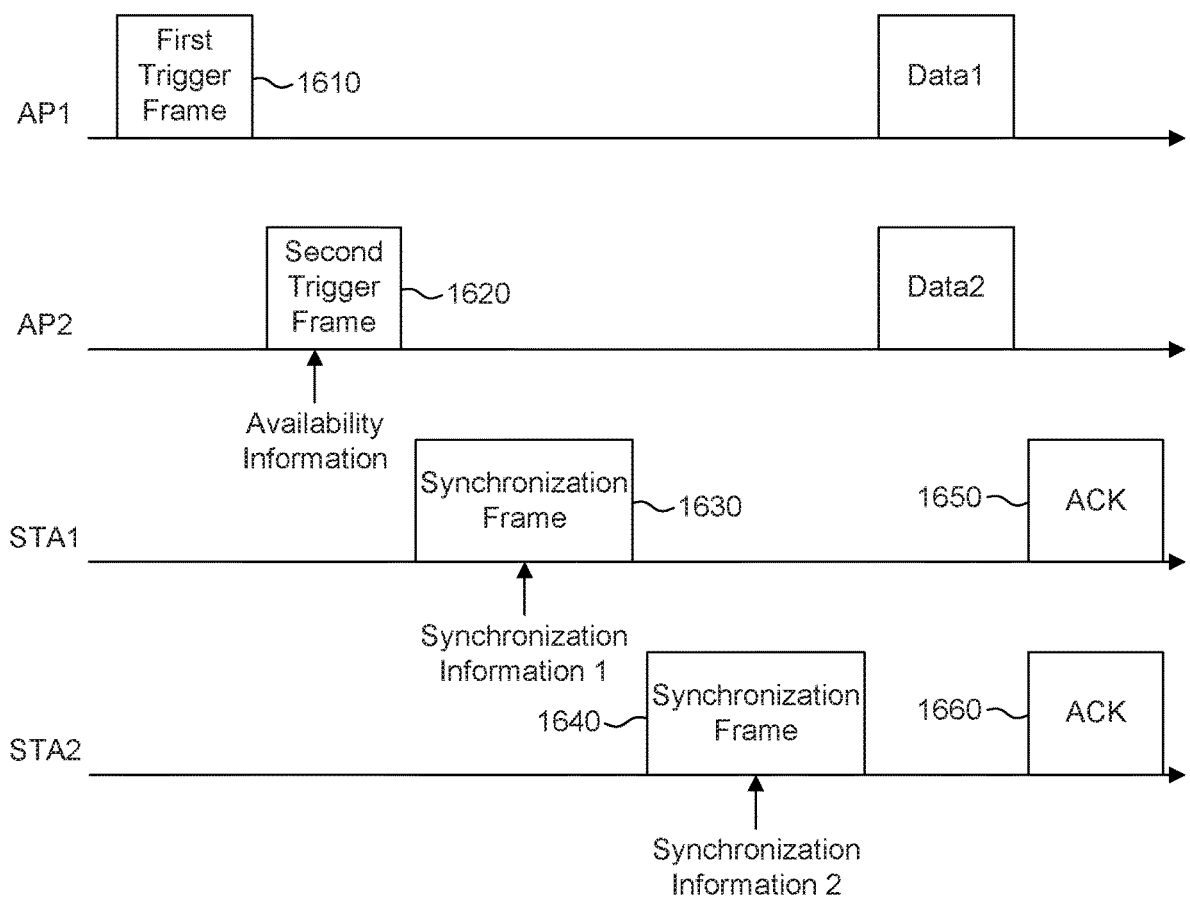
FIG. 16 illustrates an exemplary channel access procedure.

In the case of multi-AP MU-MIMO, the multi-AP trigger frame or frames may include a list of all of the STAs to be transmitted to (see e.g., FIG. 15 and FIG. 16)

As shown in FIG. 12, After reception of the multi-AP Trigger frame, the STA may transmit an inverse trigger frame 1220 to multiple APs. In the inverse trigger frame 1220, the STA may indicate repeating full or partial information carried by the trigger frame 1210 transmitted by AP1. This field may be used, for example, if AP1 and AP2 have difficulty in communicating with each other directly. This information may be provided opportunistically or one of the APs may instruct the other. Alternatively, one of the APs may instruct the other opportunistically as needed. In the inverse trigger frame 1220, the STA may also or alternatively indicate synchronization related information, such as power control information. In some such power information, the STA may indicate the transmit power of the inverse trigger frame 1220, and/or an expected received signal strength indicator (RSSI) for the multi-AP data transmission. The APs may use these two fields to decide its own transmit power. It is noted that in the case of a power imbalance between AP1 and AP2, the STA may request that the transmission from one of the STAs be turned off, resulting in single AP transmission. In the inverse trigger frame 1220, the STA may also or alternatively indicate synchronization related information, such as time and/or frequency correction information. In some such time and/or frequency correction information, the STA may request one or more of the APs to perform a time and/or frequency correction relative to the trigger frame. It is noted that the inverse trigger frame scheme may be extended to multi-AP MU-MIMO, with each STA in the MU-MIMO set transmitting an independent trigger either sequentially (see e.g., FIG. 14) or concurrently (see e.g., FIG. 13).

As shown in FIG. 12, The STA may receive data transmissions (i.e., Data 1 and Data 2) from AP1 and AP2. Depending on the Packet IDs in trigger frame 1210, the STA may or may not combine the transmissions. The STA may transmit acknowledgement frames to the AP.

In the example of FIG. 12, AP1 and AP2 may negotiate to perform concurrent transmission to a STA. In some implementations, in the negotiation, AP1 may be considered as the primary AP and AP2 may be considered as the secondary AP. In some implementations, AP1 and AP2 may perform multi-AP joint transmission sounding before and acquire the necessary channel state information.

Figure 13:
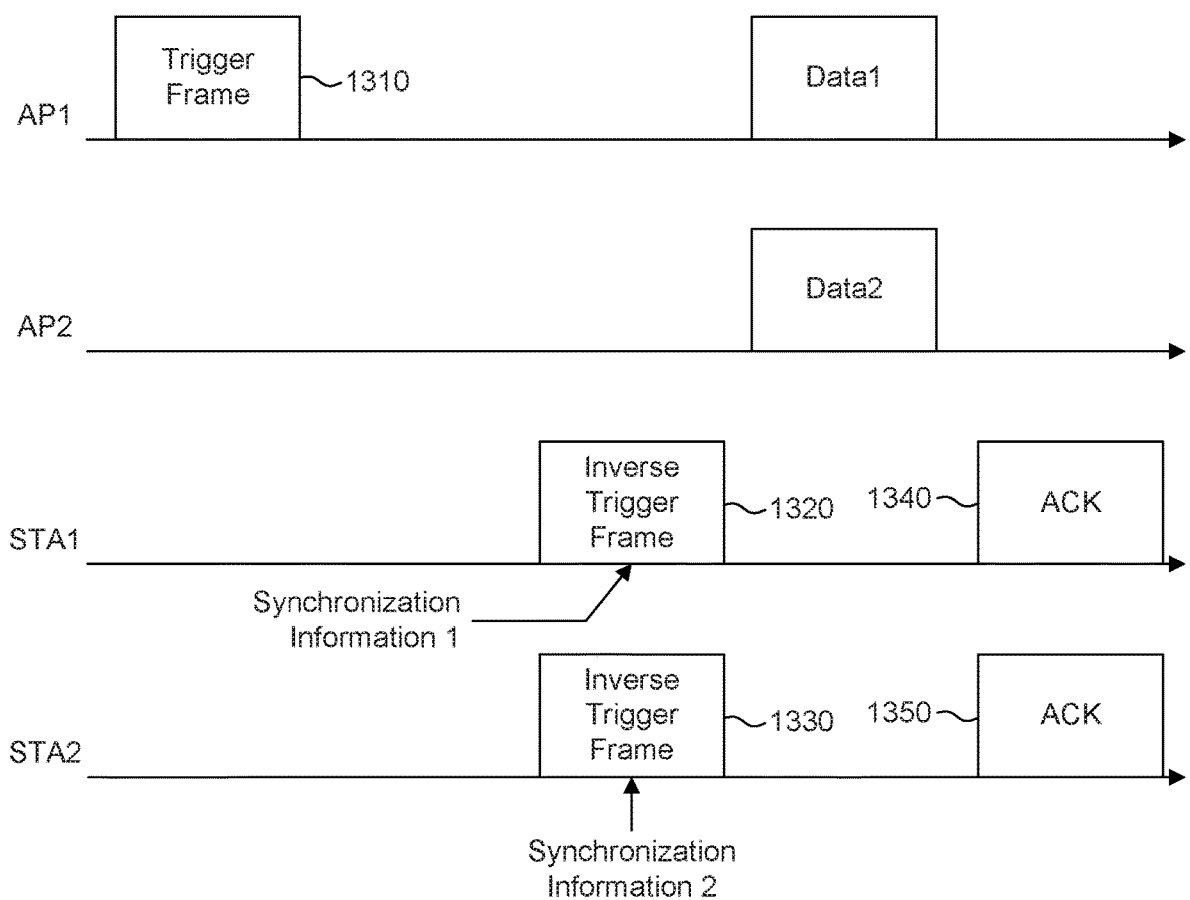
FIG. 13 illustrates an exemplary channel access procedure.

FIG. 13 illustrates an example channel access scheme which may facilitate multiple APs to transmit to a STA concurrently, where STAs transmit independent trigger frames concurrently, e.g., using UL OFDMA and/or UL MU-MIMO.

As shown in FIG. 13, AP1 transmits a trigger frame 1310 to both STA1 and STA2. Then, STA1 transmits an inverse trigger frame 1320 to both AP1 and AP2. STA2 transmits an inverse trigger frame 1330 to both AP1 and AP2. Both the inverse trigger frame 1320 and the inverse trigger frame 1330 are transmitted concurrently. Then, after receiving data from AP1 and AP2, STA1 may transmit an ACK 1340 to both AP1 and AP2, and STA2 may transmit an ACK 1350 to both AP1 and AP2.

Figure 14:
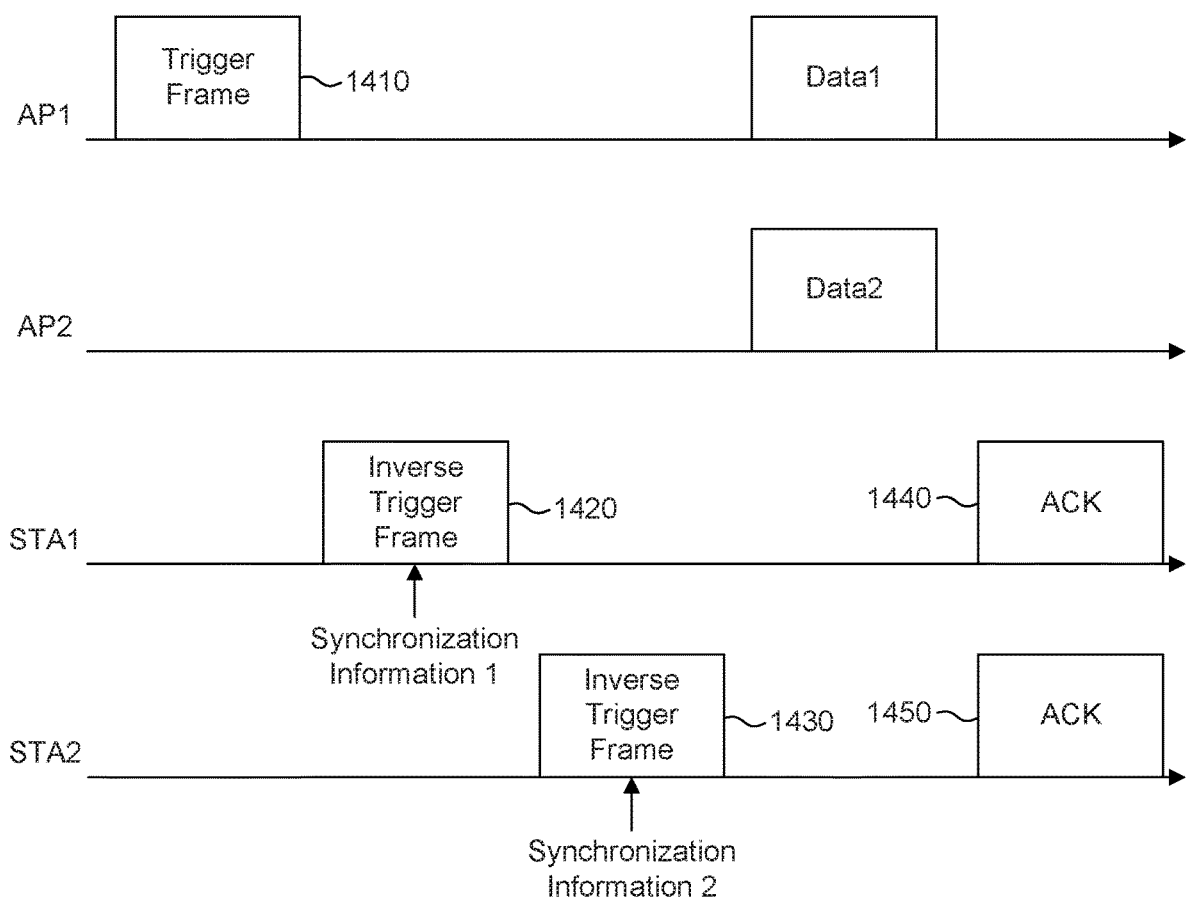
FIG. 14 illustrates an exemplary channel access procedure.

FIG. 14 illustrates an example channel access scheme which may facilitate multiple APs to transmit to a STA concurrently, where STAs transmit independent trigger frame sequentially, e.g., using UL OFDMA and/or UL MU-MIMO.

As shown in FIG. 14, AP1 transmits a trigger frame 1410 to both STA1 and STA2. Then, STA1 transmits an inverse trigger frame 1420 to both AP1 and AP2. STA2 transmits an inverse trigger frame 1430 to both AP1 and AP2. Both the inverse trigger frame 1420 and the inverse trigger frame 1430 are transmitted sequentially. Then, after receiving data from AP1 and AP2, STA1 may transmit an ACK 1440 to both AP1 and AP2, and STA2 may transmit an ACK 1450 to both AP1 and AP2.

A method of multi-AP communication according to this application is described with reference to FIGS. 15-18 as follows. The method of multi-AP communication according to this application may be performed by a WTRU.

Figure 17:
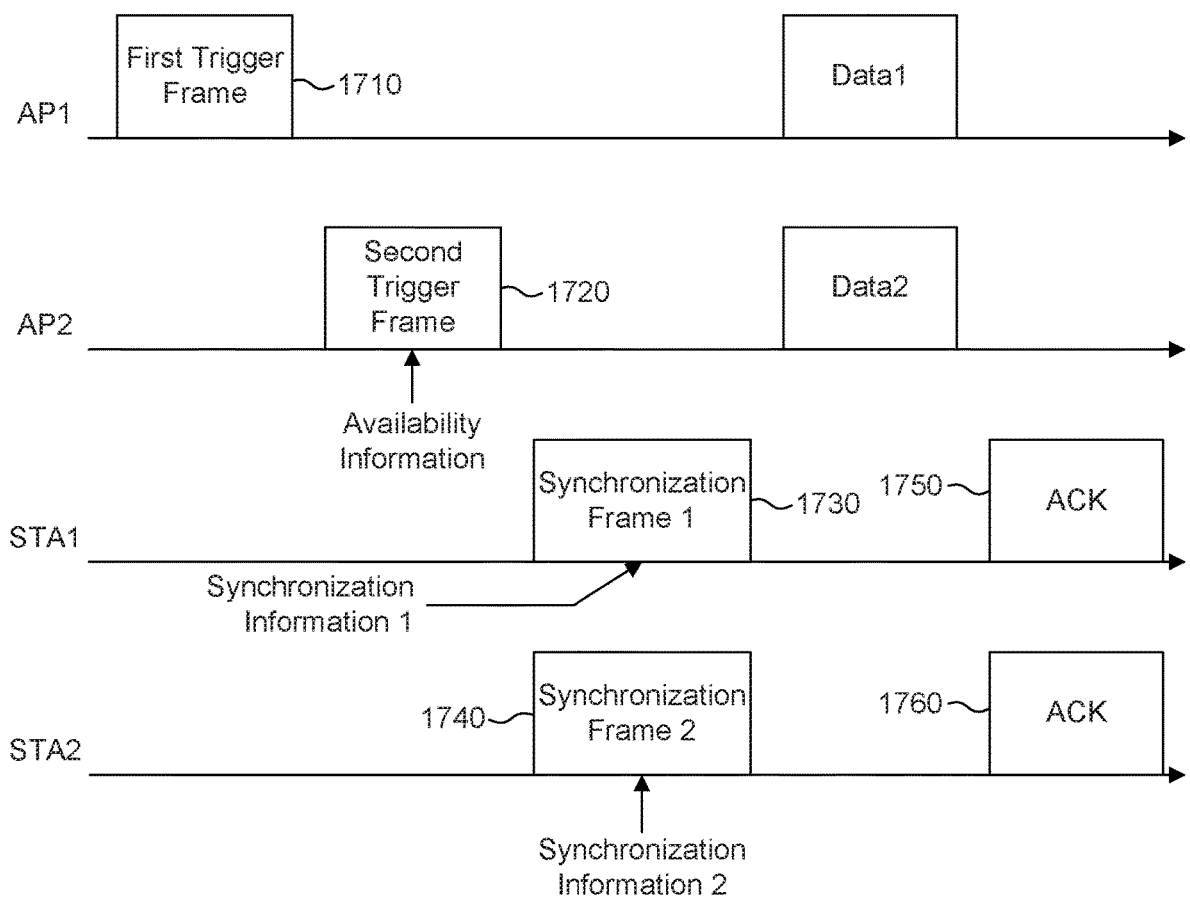
FIG. 17 illustrates an exemplary channel access procedure.
Figure 18:
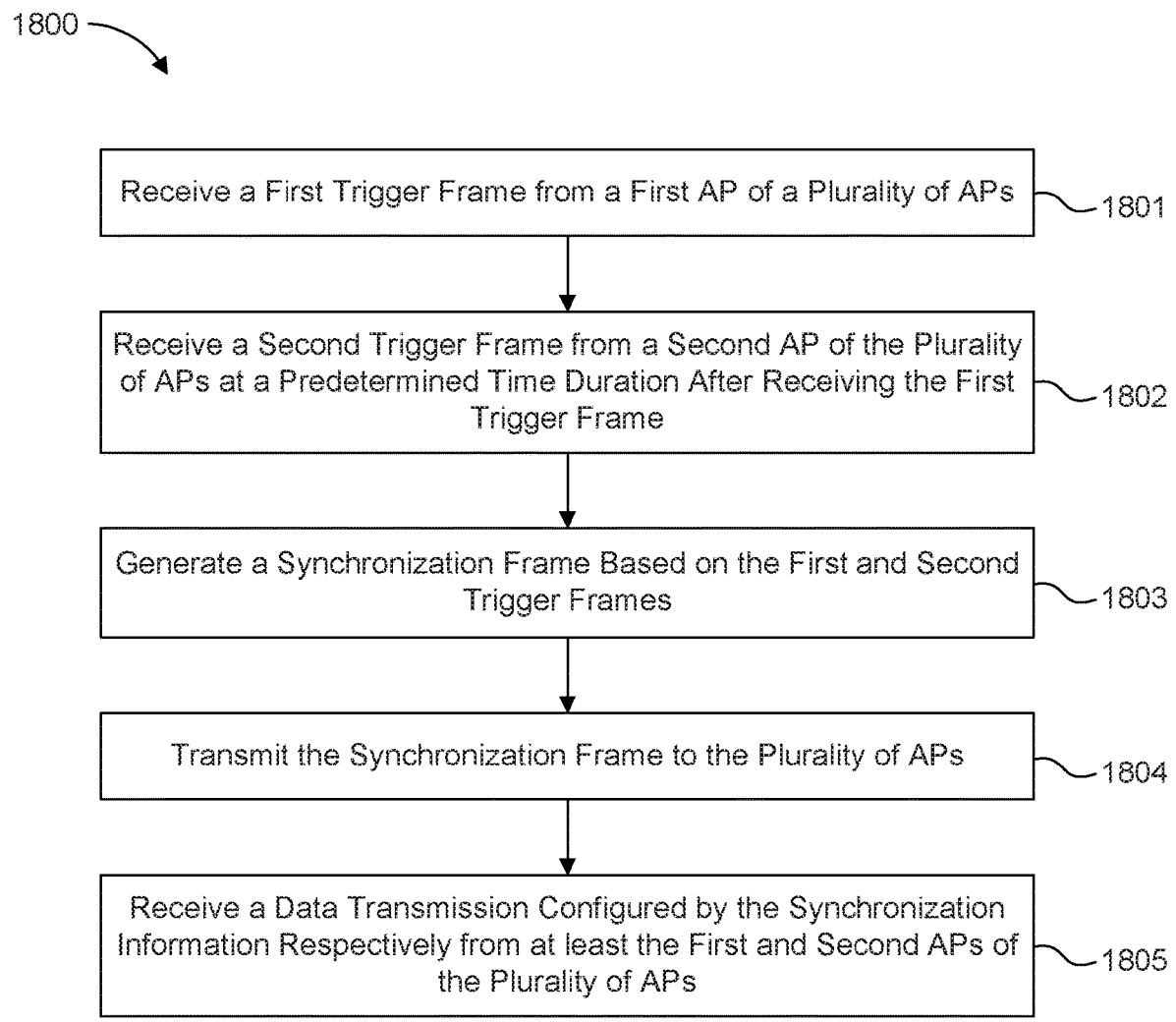
FIG. 18 illustrates an exemplary channel access procedure.

FIG. 15 illustrates an exemplary multi-AP communication procedure according to an embodiment of this application. FIG. 16 illustrates an exemplary multi-AP MU-MIIMO communication procedure according to an embodiment of this application. FIG. 17 illustrates an exemplary multi-AP MU-MIIMO communication procedure according to another embodiment of this application. FIG. 18 is a flowchart illustrating a method 1800 of multi-AP communication according to an embodiment of this application.

The method of multi-AP communication according to embodiments in this application may be applied to multi-AP communication between multiple APs and a STA. In other words, the method may be applied in a scenario where a plurality of APs have been deployed. Accordingly, the apparatus (e.g., a WTRU) for multi-AP communication according to embodiments in this application may also be applied in a scenario where multiple APs have been deployed in order to transmit data between the APs and the STA.

The method of multi-AP communication according to embodiments in this application may also be applied in a scenario with multiple APs and multiple STAs. In other words, the method may be applied in a scenario where a plurality of APs and a plurality of STAs have been deployed. Accordingly, the apparatus (e.g., a WTRU or WTRUs) for multi-AP communication according to embodiments in this application may also be applied in a scenario where a plurality of APs and a plurality of STAs have been deployed in order to transmit data between the APs and the STAs.

The following embodiments will first describe a scenario where a plurality of APs and a STA have been deployed with reference to FIG. 15 and FIG. 18, and then describe a scenario where both a plurality of APs and a plurality of STAs have been deployed with reference to FIG. 16 and FIG. 17.

Method 1800 according to an embodiment of this application will be described in detail with reference to FIG. 15 and FIG. 18 as follows. Method 1800 is a method of multi-AP communication that may be applied in WLANS. It will be appreciated that Method 1800 may also be applied in other wireless transmission fields, such as WIFI and VPMN. The above-mentioned technical fields for the application of Method 1800 is described only by way of example, and they are not intended to be exclusive or be limiting to the present application.

Method 1800 comprises: at 1801, receiving a first trigger frame from a first AP of a plurality of APs, the first trigger frame comprising first information; at 1802, receiving a second trigger frame from a second AP of the plurality of APs at a predetermined time duration after receiving the first trigger frame, the second trigger frame also comprising the first information of the first trigger frame; at 1803, generating a synchronization frame based on the first trigger frame and the second trigger frame, the synchronization frame comprising synchronization information; at 1804, transmitting the synchronization frame to at least the first AP and the second AP; and at 1805, receiving a data transmission based on the synchronization information from each of the first AP and the second AP. The above processes will be described in details with reference to embodiments as follows.

The following description will describe the process at 1801 in more detail. Method 1800 may be applied in a scenario where two APs have been deployed, e.g., AP1 and AP2 (as shown in FIG. 15). Accordingly, the apparatus for multi-AP transmission according to embodiments in this application may also be applied in a two-AP scenario, such as the scenario in FIG. 15.

In a scenario with two APs, one may be a master AP or a primary AP, and another one may be a slave AP or a secondary AP. As shown in FIG. 15, AP1 and AP2 may negotiate and determine that AP1 is the master AP and AP2 is the slave AP. AP1 and AP2 may perform multi-AP joint transmission sounding before and acquire any necessary channel state information. For the purpose of a clear and definite description of this application, unless otherwise indicated, the terms "AP1", "master AP" and "primary AP" are used interchangeably in this application, and the terms "AP2", "slave AP" and "secondary AP" are used interchangeably in this application.

Although the example shown in FIG. 15 only illustrates two APs, it is only described by way of example and it is not intended to be exclusive and be limiting to embodiments of this application. For example, Method 1800 may also be applied in a scenario having three APs, i.e., a first AP, a second AP and a third AP. Accordingly, the apparatus (e.g., a WTRU) for multi-AP communication according to embodiments in this application may also be applied in the above-mentioned three-AP scenario.

The number of APs in embodiments of this application might be even greater than three. Embodiments of this application does not specifically limit the number of APs. It will be appreciated that the number of APs may vary based on many variables, such as a demand for upcoming data transmission between APs and STAs, a wireless transmission technology used and the number of STAs.

As shown in FIG. 15, in one embodiment, AP1 may acquire a channel and transmit the first trigger frame 1510 (i.e., a multi-AP trigger frame) to the STA.

The first trigger frame 1510 sent by AP1 may be used to trigger a transmission from other APs and/or STAs. FIG. 15 illustrates an embodiment of multi-AP downlink transmission (i.e., Data 1 and Data 2) from AP1 and AP2 to the STA. Therefore, in the multi-AP downlink transmission scenario, the first trigger frame 1510 may be used to configure a data transmission (i.e., Data 1) from AP1 to the STA. Further, the first trigger frame 1510 may also be used to configure a data transmission (i.e., Data 2) from AP2 to the STA. In order to synchronize both data transmissions, the first trigger frame 1510 may be used to trigger a second trigger frame (e.g., second trigger frame 1520) to be sent by AP2 and a synchronization frame (e.g., synchronization frame 1530) to be sent by the STA.

Figure 19:
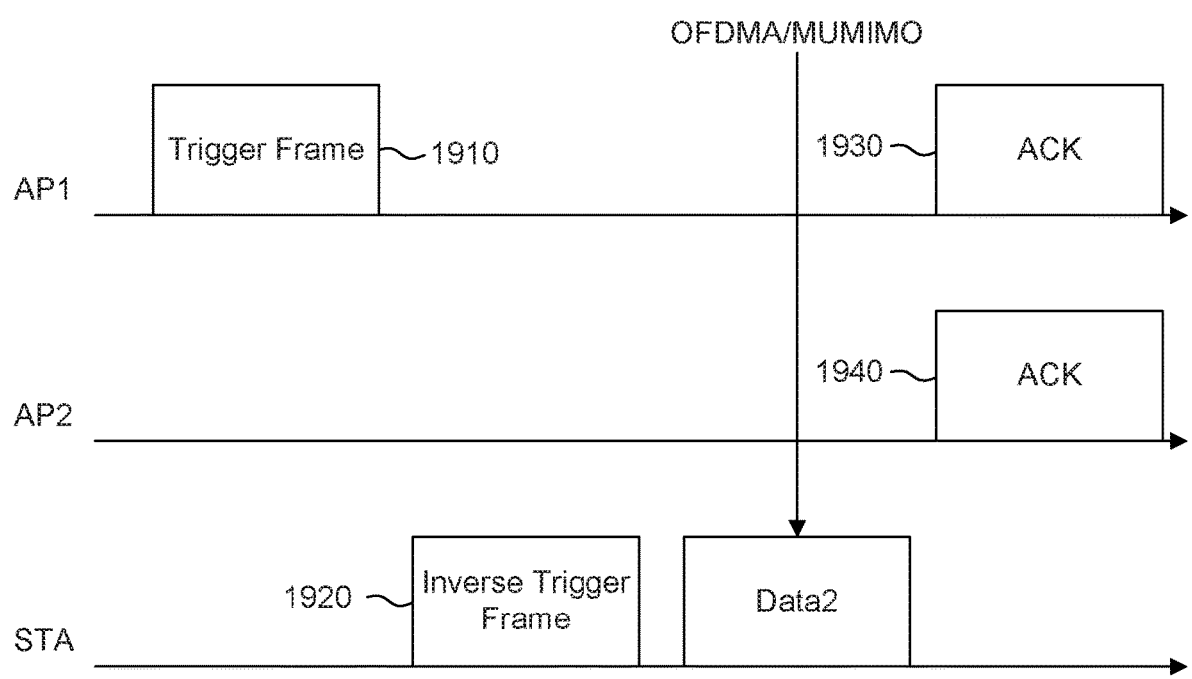
FIG. 19 illustrates an exemplary channel access procedure.
Figure 20:
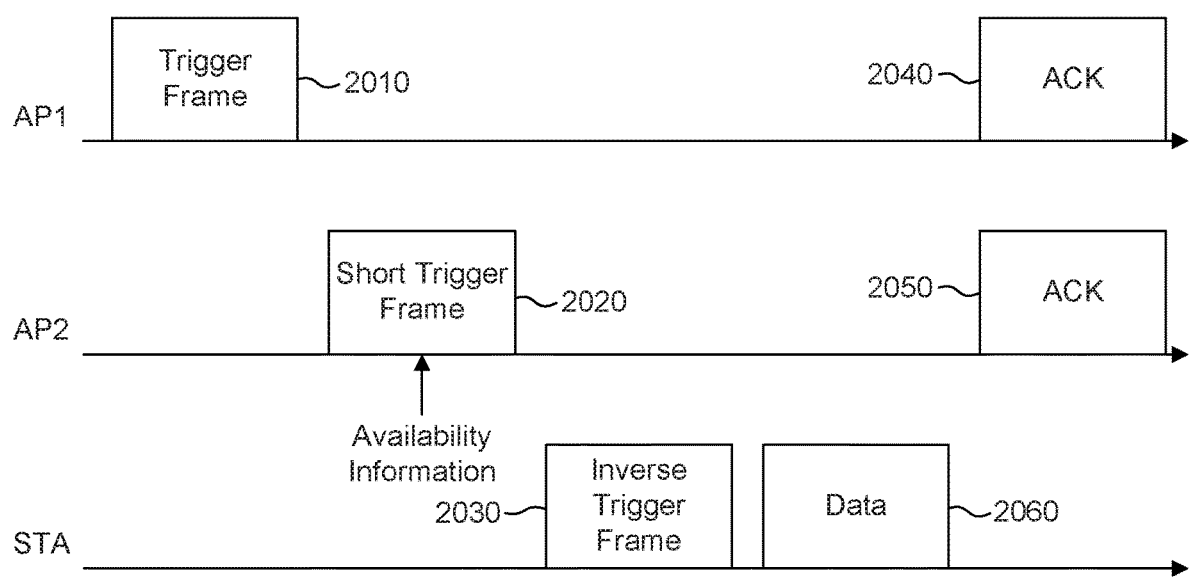
FIG. 20 illustrates an exemplary channel access procedure.

It should be noted that a trigger frame sent by AP1 may also be used to configure an uplink transmission as shown in FIG. 19 and FIG. 20, For example, in an embodiment shown in FIG. 19, a trigger frame 1910 may be used to trigger an inverse trigger frame (e.g., inverse trigger frame 1920) to be sent by STA. In an embodiment shown in FIG. 20, a trigger frame 2010 may be used to trigger a second trigger frame (e.g., short trigger frame 2020) to be sent by AP2 and an inverse trigger frame (e.g., inverse trigger frame 1920) to be sent by STA. Those embodiments shown in FIG. 19 and FIG. 20 will be described in detail later.

The first trigger frame 1510 may also be used to indicate the STA how many spatial streams and which modulation and coding scheme (MCS) to use when transmitting on the assigned RUs. Because the first trigger frame 1510 is sent by the master AP (i.e., AP1), unless otherwise indicated, the term "first trigger frame" may also be referred to as "master trigger frame."

The first trigger frame 1510 may comprise one or any combination of the following information as its first information: RU allocation information, STA-specific information, and common information, etc. It will be appreciated that those above information carried by the first trigger frame 1510 may be configured into different fields. For example, the RU allocation information may be configured in a RU allocation information field; the STA-specific information may be configured in one or more STA Information fields; and the common information may be configured in a common information field. When some specific information carried by the first trigger frame 1510 is described in the following description, it means the information configured in a specific field.

The STA-specific information may comprise a STA role or a STA ID. The STA ID may indicate whether the STA is a transmitter (e.g., AP1 shown in FIG. 15) or a receiver (e.g., the STA shown in FIG. 15). It will be appreciated that generally speaking, WTRUs (e.g., the STA shown in FIG. 15) and APs (e.g., AP1 shown in FIG. 15) may be referred to as STAs. For example, in a scenario of WLANS, a router (e.g., an AP) may be referred to as a station, and a laptop (e.g., a STA) may also be referred to as a station. The STA ID here in this application may indicate whether a station is an AP STA (e.g., AP1 shown in FIG. 15) or a non-AP STA (e.g., the STA shown in FIG. 15).

The STA ID may be an AID, a compressed AID, a BSSID, a compressed BSSID, a BSS color, or an enhanced BSS color, etc.

If the STA ID indicates a transmitter (e.g., AP1), then the first trigger frame 1510 may further comprise one or any combination of the following fields: a packet ID field, a resource allocation field, a spatial stream allocation field, and a MCS related information field.

The packet ID field may be used to indicate a packet transmitted to the STA. In some embodiments, the packet ID field may be a transmitter/AP specific field. The STA may detect multiple packet IDs carried by the packet ID field corresponding to the multiple APs and determine whether a single packet is transmitted from multiple APs or multiple packets are transmitted from multiple APs. In some embodiments, the STA may combine the transmissions from multiple APs to decode the single packet.

The resource allocation field may be used to indicate the resources allocated to the AP1 to transmit the multi-AP packet. In an OFDMA transmission scenario, the resource may be allocated in units of resource unit (RU).

The spatial stream allocation field may be used to indicate a starting spatial stream index and the number of spatial streams used for the transmitter (i.e., AP1).

The MCS-related information field may include MCS, coding scheme, and information to indicate whether DCM modulation is utilized, etc.

The common information may comprise a type field. The type field may indicate a DL multi-AP transmission. The type field may also indicate a trigger frame transmitted from an AP. In the case of multi-AP MU-MIMO communication, a multi-AP trigger frame or frames may contain a list of all the STAs to which to transmit (see e.g., FIG. 16 and FIG. 17).

The first trigger frame 1510 may further comprise at least one of the following information as its first information: transmission power information, transmission starting time information, transmission frequency information, etc. Accordingly, those information may also be configured into different fields in order for the first trigger frame to carry.

For example, the first trigger frame 1510 may comprise a power field to indicate a transmission power of a upcoming data transmission from AP1 to the STA. The first trigger frame 1510 may also comprise a time field to indicate a starting time of a upcoming data transmission from AP1 to the STA. The first trigger frame may also comprise a frequency field to indicate a transmission frequency of a upcoming data transmission from AP1 to the STA.

For another example, the first trigger frame 1510 may further comprise transmission starting time information for transmitting the synchronization frame 1530 from the STA. In other words, the first trigger frame 1510 may indicate a starting time for transmitting the synchronization frame 1530 shown in FIG. 15 from the STA. The starting time information may also be configured into a specific field of the first trigger frame in order for it to carry.

Although the above description illustrated some exemplary embodiments of the first information in the first trigger frame 1510, those embodiments are not intended to be exclusive or be limiting to the first information. The first information described in the present application may include any combination of the above-mentioned exemplary information or any other information available to obtain the technical solution of this application.

Further, the first information of the first trigger frame is a relative term comparing to those terms "a second information of the first trigger frame" and "a third information of the first trigger frame". In this application, using those terms does not mean that the first information, the second information and the third information are completely different information. In some embodiments, they may share the same information between each other. Their relationship will be further described in detail below.

Those information carried by the first trigger frame may be used for data transmission synchronization between the multiple APs (e.g., AP1 and AP 2 shown in FIG. 15) and the STA. It will be appreciated that the term "synchronization" in this application means synchronizing one or multiple parameters of the upcoming data transmissions, such as a synchronization in transmission power, a synchronization in transmission starting time, and a synchronization in transmission frequency. In other words, those parameters to be synchronized for the upcoming data transmissions may comprise the transmission power, the transmission starting time and the transmission frequency.

For example, the transmission power information carried by the first trigger frame may be used for pre-correcting transmission power from the multiple APs to the STA so that those signals (e.g., data transmissions) from the APs may reach the STA with similar received powers. The transmission starting time information carried by the first trigger frame may be used for pre-correcting transmission starting time from the multiple APs to the STA so that those signals from the APs may reach the STA with similar received time. The transmission frequency information carried by the first trigger frame may be used for pre-correcting transmission frequency from the multiple APs to the STA so that those signals from the APs may reach the STA with similar received frequencies.

It will be appreciated that the above-mentioned three parameters for multi-AP transmission are described only in way of example, and they are not intended to be exclusive or be limiting to the present application. For example, the first trigger frame 1510 may be used to synchronize any combination of those three parameter for the upcoming data transmission.

It will be appreciated that the synchronization described in this application may not be obtained through the first trigger frame 1510 alone. The first trigger frame 1510 is an essential part of the synchronization, but Method 1800 and the apparatus (e.g., a WTRU) according to this application still need the second trigger frame 1520 and the synchronization frame 1530 (described below) to obtain the synchronization. For example, as shown in FIG. 15, after receiving the first trigger frame 1510, the STA may send the synchronization frame 1530 to the multiple APs, and the synchronization frame 1530 may carry synchronization information which is necessary for synchronizing the upcoming data transmissions respectively from the multiple APs. The following description will describe the second trigger frame 1520 and the synchronization frame 1530 in more detail.

In an embodiment, the first trigger frame 1510 may also be sent to other APs, such as AP2 shown in FIG. 15, that is, the first trigger frame 1510 from AP1 can be overheard by all STAs shown in FIG. 15 other than AP1. Therefore, the first trigger frame 1510 may be used to configure a parameter or multiple parameters of a upcoming data transmission (i.e., data 2 shown in FIG. 15) from AP2 to the STA. Since both the upcoming data transmissions respectively from AP1 and AP2 may be configured by the first trigger frame 1510, the upcoming data transmissions from both AP1 and AP2 may be synchronized accordingly. The following description will describe how to use the first trigger frame 1510 to configure the upcoming data transmission from AP 2 with reference to the process at 1802.

In an embodiment with more than two APs, AP1 may send the first trigger frame to all other APs. Based on a principle similar to that illustrated above, all upcoming data transmission from these APs may be synchronized accordingly.

In order to receive the first trigger frame from AP1, the STA may be configured to comprise a receiver. The receiver may be a USB receiver, a wireless LAN receiver or any other kind of receiver that may be used to receive a signal transmitted within a WLAN scenario shown in FIG. 15 and FIG. 4.

For the purpose of clear and definite description of the embodiments in this application, unless otherwise indicated, an upcoming data transmission from AP1 to the STA may be referred to as a first data transmission, and an upcoming data transmission from AP 2 to the STA may be referred to as a second data transmission. As shown in FIGS. 15-17, the first data transmission may be referred to as Data 1, and the second data transmission may be referred to as Data 2.

The following description will describe the process at 1802 in more detail. As described above, AP1 may also send the first trigger frame 1510 to AP 2. After receiving the first trigger frame 1510, AP2 may generate and transmit a second trigger frame 1520 to the STA. Because it may take some time for the first trigger frame 1510 to be transmitted from AP1 to AP2, and it may also take some time for AP2 to generate the second trigger frame 1520, there may be a time duration (i.e., SIFS shown in FIG. 15) between the time of transmitting the first trigger frame 1510 and the time of transmitting the second trigger frame 1520. Accordingly, at the STA side, there may be a time duration-SIFS between the time of receiving the first trigger frame 1510 and the time of receiving the second trigger frame 1520. That is to say, the STA may receive the first trigger frame 1510 first, and then after the time duration-SIFS, the STA may receive the second trigger frame 1520.

As shown in FIG. 15, three blocks respectively representing the first trigger frame 1510, the second trigger frame 1520 and the synchronization frame 1530 are located at three different horizontal lines, each of which represents one of AP1, AP2 and the STA. Although these blocks are located at different places in the vertical direction, it will be appreciated that they are only illustrated in this way for the purpose of showing a source of each frame, and their projections in the horizontal direction may represent the time of receiving each frame at the STA side.

The time duration may be predetermined through some existing parameters. For example, the time duration may be predetermined based on the distance between AP1 and AP2, and a length of time for AP 2 to generate the second trigger frame. In other words, as long as the distance between AP1 and AP2 is already known and the length of time for generating the second trigger frame is already known, the time duration may be known.

In embodiments, once AP1 and AP2 have been constructed, the distance between them may be fixed and thus known. Further the hardware that constitutes the APs may also be fixed after their construction. Therefore, the length of time for generating the second trigger frame may also be known. Thus, the time duration may be predetermined after the construction of the APs.

The time duration SIFS may be predetermined by AP1 and/or AP2. For example, the time duration may be predetermined by AP1. In that case, the first trigger frame 1510 may further comprise a time-duration field to carry time duration information. The time duration information may indicate when AP2 should send out the second trigger frame 1520 after its reception of the first trigger frame 1510. Then, after AP 2 receives the first trigger frame 1510, it will generate and send out the second trigger frame 1520 based on the time duration information. It will be appreciated that in that case, the time duration SIFS indicated by the time duration information should be longer than a length of time for transmitting the first trigger frame 1510 from AP1 to AP2 plus a length of time for AP 2 to generate the second trigger frame 1520.

In an embodiment, the time duration (i.e., SIFS shown in FIG. 15) may be predetermined through any inter-frame spacing, e.g., short IFS (SIFS), point coordination function (PCF) IFS (PIFS), distributed coordination function (DCF) IFS (DIFS), etc.

The second trigger frame may comprise the above-mentioned first information of the first trigger frame 1510.

The first information of the first trigger frame 1510 may be information which may be shared with the second trigger frame 1520. For example, the first information of the first trigger frame is the above-mentioned common information which indicates a DL multi-AP transmission. Then, AP 2 can directly copy that information into the second trigger frame 1520.

In an embodiment, the first information of the first trigger frame 1510 may be transmission power information for an upcoming data transmission from AP1 to the STA. Then, AP2 determines that the transmission power indicated by the transmission power information is within its transmission power limitation. Therefore, AP 2 may directly write the transmission power information into the second trigger frame 1520.

It will be appreciated that the above-mentioned embodiments of the second trigger frame 1520 are merely described by way of example, and they are not intended to be exclusive or be limiting to the present application.

In embodiments, the second trigger frame 1520 may be generated to be any one of the following formats: for format (1), the second trigger frame 1520 is the same as the first trigger frame 1510, i.e., the second trigger frame 1520 comprises all of the information of the first rigger frame 1510; for format (2), the second trigger frame 1520 is a subset of the first trigger frame 1510, i.e., the second trigger frame 1520 only comprises a part of information of the first trigger frame 1510 (e.g., the above-mentioned first information of the first trigger frame 1510); and for format (3), the second trigger frame 1520 comprises both a part of information of the first trigger frame 1510 (e.g., the above-mentioned first information of the first trigger frame 1510) and configuration information for an upcoming data transmission (i.e., Data 2) from AP2.

In an embodiment, the configuration information in the second trigger frame 1520 may be different from a second information of the first trigger frame 1510. For example, the first trigger frame 1510 may indicate AP2 to use a particular channel (e.g., channel 2) for an upcoming data transmission (i.e., Data 2) to the STA. That is, the second information of the first trigger frame 1510 may be information of the channel 2 to be used by AP2 for the second data transmission. However, AP2 may figure out that the channel 2 is not available for it to do the transmission. In that case, AP 2 may transmit a second trigger frame 1520 with a configuration information to both AP1 and the STA to indicate that the channel 2 is unavailable. In that case, the configuration information (i.e., the channel 2's unavailability) is different from the second information of the first trigger frame 1510 (i.e., the choice of the channel 2).

In the above example, if AP2 figures out that the channel 2 is not available but another channel (e.g., a channel 3) is available for it to do the data transmission. Then, AP2 may transmit a second trigger frame with a configuration information to both AP1 and the STA to indicate that the channel 2 is unavailable and that AP2 will use the channel 3 for the upcoming data transmission from AP 2 to the STA. In that case, the configuration information (i.e., the channel 2's unavailability and the choice of the channel 3) is different from the second information of the first trigger frame 1510 (i.e., the choice of the channel 2). In other words, the configuration information may overwrite the second information of the first trigger frame 1510.

For example, the first trigger frame 1510 may indicate AP2 to use a particular transmission power for an upcoming data transmission (i.e., Data 2) to the STA. That is, the second information of the first trigger frame 1510 may be information of a transmission power (e.g., a transmission power 2) to be used by AP2 for the second data transmission. However, AP2 may figure out that the transmission power 2 is beyond a power limitation of AP2. In that case, AP2 may transmit a second trigger frame with a configuration information to both AP1 and the STA to indicate that the transmission power 2 is unavailable and that AP2 will use its desired transmission power (e.g., a transmission power 3) for the second data transmission. In that case, the configuration information (i.e., the transmission power 2's unavailability and the choice of the transmission power 3) is different from the second information of the first trigger frame 1510 (i.e., the transmission power 2). In other words, the configuration information may overwrite the second information of the first trigger frame 1510.

It will be appreciated that the above mentioned channels and transmission powers are merely described by way of example, and they are not intended to be exclusive or be limiting to the configuration information in the second trigger frame 1520. The configuration information may comprise other information as long as those information may be necessary to configure the second data transmission.

In an embodiment, the configuration information in the second trigger frame 1520 may be additional information not comprised in the first trigger frame 1510.

For example, the first trigger frame 1510 may comprise the transmission power information and the transmission starting time information, but no transmission frequency information. That is, the second information of the first trigger frame 1510 may be the transmission power information and the transmission starting time information to be used by AP2 for the second data transmission. Then AP2 may send a second trigger frame 1520 with a configuration information to both AP1 and the STA to indicate a desired transmission frequency of AP2 for the second data transmission. In that case, the configuration information (i.e., a desired transmission frequency of AP 2) is additional information not comprised in the first trigger frame. In the above example, the STA may send a synchronization frame 1530 (further described below) with the desired transmission frequency of AP2 to both AP1 and AP2, and thus the APs may do data transmissions by using the desired transmission frequency. Thus, the synchronization in transmission frequency may be obtained. The synchronization process will be further described below with reference to the synchronization frame 1530 from the STA.

It will be appreciated that the above mentioned transmission frequency are merely described by way of example for the configuration information, and they are not intended to be exclusive or be limiting to the configuration information in the second trigger frame 1520. The configuration information may comprise other information which has not been comprised in the first trigger frame 1510 as long as those information may be necessary for synchronizing the upcoming data transmissions.

In embodiments, the second trigger frame 1520 may be an NDP frame which may carry AP2's identity. The NDP frame may indicate that AP 2 is ready for the upcoming multi-AP transmission. The second trigger frame 1520 may also comprise a starting time field indicating a transmission starting time for the transmission of the synchronization frame 1530.

As describe above, both WTRUs and APs may be referred to as STAs. Therefore, in an embodiment with more than two APs, the second trigger frame 1520 may also be sent to all other APs, that is, the second trigger frame 1520 from AP2 can be overheard by all STAs other than AP2, including both AP STAs and non-AP STAs. In an embodiment with multiple AP STAs and multiple non-AP STAs shown in FIG. 16, a second trigger frame may also be sent to all STAs.

In an embodiment, multiple APs may transmit trigger frames sequentially, and an order of trigger frame transmission may be negotiated between the multiple APs using a management/control frame. For example, assuming that a management/control frame indicates that AP1 may transmit a trigger frame (e.g., first trigger frame 1510) first and then AP2 may transmit a trigger frame (e.g., second trigger frame 1520) second.

In an embodiment, the order of the trigger frame transmission may be predefined by a predetermined rule. For example, AP1, the primary AP, may transmit the trigger frame first. The rest of the multiple APs may transmit in the ascending/descending order based on the BSSID or AP MAC address. It will be appreciated that all the APs in the group may know the member AP BSSIDs or MAC addresses.

The following description will describe the process at 1803 in more detail. After receiving both the first trigger frame 1510 and the second trigger frame 1520, the STA shown in FIG. 15 may generate a synchronization frame 1530 based on the first and second trigger frames. the synchronization frame 1530 comprises a synchronization information to configure a data transmission from each of AP1 and AP2 to the STA.

Similar to the first trigger frame 1510, the synchronization frame 1530 may comprise one or any combination of the following information: RU allocation information, STA-specific information, and common information, etc. Those above information carried by the synchronization frame 1530 may be configured into different fields.

The synchronization frame 1530 may further comprise transmission power information, transmission starting time information, transmission frequency information, etc. Accordingly, those information may also be configured into different fields in order for the synchronization frame 1530 to carry. The above-mentioned information may be referred to as synchronization information which may be used to configure an upcoming data transmission from each of AP1 and AP2 to the STA.

It will be appreciated that the above-mentioned information comprised in the synchronization frame 1530 is only described by way of example, and it is not intended to be exclusive or be limiting to those information which may be comprised in the synchronization frame 1530.

In order to generate the synchronization frame 1530, the apparatus (e.g., a WTRU) according to this application comprises a processor. As shown in FIG. 15, the processor is configured to generate the synchronization frame 1530 based on the first and second trigger frames respectively received from AP1 and AP2.

In embodiments, the synchronization frame 1530 may share the same format with the first trigger frame 1510. In other words, the synchronization frame 1530 may be generated to be any one of the following formats: for format (1), the synchronization frame 1530 is the same as the first trigger frame 1510, i.e., the synchronization frame 1530 comprises all of the information of the first rigger frame 1510; for format (2), the synchronization frame 1530 is a subset of the first trigger frame 1510, i.e., the synchronization frame 1530 only comprises a part of information of the first trigger frame 1510; and for format (3), the synchronization frame 1530 comprises both a part of information of the first trigger frame and confirmation information.

For the format (1) and the format (2), the synchronization frame 1530 may comprise a full or partial information carried by the first trigger frame 1510 transmitted by AP1. This full or partial information may be beneficial. For example, if AP1 and AP2 may have difficulty in communicating with each other directly, then the STA may transmit those information originated from AP1 to AP2 for the purpose of data transmission synchronization.

For the format (3), the confirmation information may be used to confirm those information carried by the first trigger frame 1510 and/or the second trigger frame 1520. The confirmation information may also be used to confirm any configuration modification by AP2. The confirmed configuration may be based on the first trigger frame 1510 or the second trigger frame 1520 or a combination of the first trigger frame 1510 and the second trigger frame 1520.

For example, if the first trigger frame 1510 indicates that a transmission power for the first data transmission is power 1, and the second trigger frame 1520 indicates that a transmission power for the second data transmission is also power 1, then the confirmation information may be used to confirm to both AP1 and AP2 that they may use the power 1 for their upcoming data transmissions. Meanwhile, if the first trigger frame 1510 comprises a group of information comprising a spatial stream allocation and a MCS-related information, then, this group of information may be referred to as the third information of the first trigger frame 1510 which may be comprised into the synchronization frame 1530.

In embodiments, the synchronization frame 1530 may share the same format as that of the second trigger frame 1520. In other words, the synchronization frame 1530 may be generated to be any one of the following formats: for format (1), the synchronization frame 1530 is the same as the second trigger frame 1520, i.e., the synchronization frame 1530 comprises all of the information of the second rigger frame 1520; for format (2), the synchronization frame 1530 is a subset of the second trigger frame 1520, i.e., the synchronization frame 1530 only comprises a part of information of the second trigger frame 1520; and for format (3), the synchronization frame 1530 comprises both a part of information of the second trigger frame 1520 and confirmation information corresponding to the above-mentioned configuration information in the second trigger frame 1520.

For the format (1) and the format (2), the synchronization frame 1530 may comprise a full or partial information carried by the second trigger frame 1520 transmitted by AP 2. This full or partial information may be beneficial. For example, if AP1 and AP2 may have difficulty in communicating with each other directly, then the STA may transmit those information originated from AP2 to AP1 for the purpose of data transmission synchronization.

For the format (3), the confirmation information may be used to confirm any configuration modification by AP2. The confirmed configuration may be based on the first trigger frame 1510 or the second trigger frame 1520 or a combination of the first trigger frame 1510 and the second trigger frame 1520.

As shown in FIG. 15, the synchronization information may be used to synchronize a parameter or multiple parameters of the first data transmission from AP1 with a parameter or multiple parameters of the second data transmission from AP2. In an embodiment, the synchronization information comprises transmission power information, transmission starting time information and transmission frequency information.

For example, the synchronization information may comprise transmission frequency information. In that case, the first trigger frame 1510 received from AP1 may indicate that a transmission frequency for the first data transmission may be a frequency 1, and the second trigger frame 1520 received from AP 2 may indicate that a transmission frequency for the second data transmission may be a frequency 2. Then, the STA may generate a synchronization frame 1530 with particular transmission frequency information to indicate a desired transmission frequency for both of the upcoming data transmissions. AP1 and AP2 may do the upcoming data transmissions based on the desired transmission frequency.

In an embodiment with more than two APs and one STA, a synchronization frame from the STA may be configured to synchronize a parameter (or multiple parameters) of a upcoming data transmission from each of the multiple APs.

It will be appreciated that according to the embodiments of this application, the synchronization process of upcoming data transmissions from multiple APs might not be completed by the synchronization frame 1530 alone, and it needs frame interactions between the STA and the APs. Based on the above description, the synchronization process may be achieved by the first trigger frame 1510, the second trigger frame 1520 and the synchronization trigger frame 1530.

At 1804, the STA may send the synchronization frame 1530 to both AP1 and AP2. In an embodiment with more than two APs and one STA, at 1804, the STA may send the synchronization frame 1530 to at least AP1 and AP2. However, the embodiment shown in FIG. 15 is not intended to be exclusive or be limiting to the principle of this application. For example, the STA may select that only AP1 or only AP2 may transmit data to the STA. The AP down-selection may depend on the information carried in the trigger frames transmitted from AP1 and AP2 or the STA measurement based on the transmission from AP1 and AP2. For example, if a received SNR (i.e., Signal to Noise Ratio) or RSSI from one AP is lower than a predefined/predetermined threshold, then the STA may exclude that AP from multi-AP transmission.

Based on the synchronization frame from the STA, AP1 may do the first data transmission to the STA and AP2 may do the second data transmission to the STA. That is, at 1805, the STA may receive a data transmission based on the synchronization information from each of AP1 and AP2. It should be noted that the first and second data transmission from AP1 and AP2 may be concurrent using the same frequency resources (e.g. Multi-AP MU-MIMO or Multi-AP nulling or coordinated SU/MU or coordinated nulling/beamforming), or using different frequency resources (e.g. Multi-AP OFDMA, coordinated OFDMA transmission)

In an embodiment, after receiving the first and second data transmission, the STA may transmit an ACK/NACK report (i.e., ACK 1540 shown in FIG. 15) to each of AP1 and AP2.

It is noted that the method of multiple-AP transmission according to this application may be extended to multi-AP MU-MIMO with each STA in the MU-MIMO set transmitting an independent trigger either sequentially (as shown in FIG. 16) or concurrently (as shown in FIG. 17).

FIG. 16 illustrates an exemplary multi-AP MU-MIMO communication procedure according to an embodiment of this application.

As shown in FIG. 16, a STA1 may receive a first trigger frame 1610 from AP1, and may receive a second trigger frame 1620 from AP2. Then, the STA1 may generate a synchronization frame 1630 based on the first trigger frame 1610 and the second trigger frame 1620, and then transmit the synchronization frame 1630 to both AP1 and AP2. A STA2 may receive a first trigger frame 1610 from AP1, and may receive a second trigger frame 1620 from AP2. Then, the STA2 may generate a synchronization frame 1640 based on the first trigger frame 1610 and the second trigger frame 1620, and then transmit the synchronization frame 1640 to both AP1 and AP2.

As shown in FIG. 16, the STA1 may transmit the synchronization frame 1630 first, and then the STA2 may transmit the synchronization frame 1640. The first trigger frame 1610 is similar to or the same as the first trigger frame 1510 shown in FIG. 15. The second trigger frame 1620 is similar to or the same as the second trigger frame 1520 shown in FIG. 15. The synchronization frame 1630 and the synchronization frame 1640 are similar to or the same as the synchronization 1530 shown in FIG. 15.

As shown in FIG. 16, after AP1 and AP2 receive the synchronization frame 1630 and the synchronization frame 1640, AP1 and AP2 may transmit data (i.e., Data 1 and Data 2 shown in FIG. 16) respectively to STA1 and STA2. Then, STA1 may transmit ACK 1650 respectively to AP1 and AP2. STA2 may transmit ACK 1660 respectively to AP1 and AP2.

FIG. 17 illustrates an exemplary multi-AP MU-MIIMO communication procedure according to another embodiment of this application.

As shown in FIG. 17, a STA1 may receive a first trigger frame 1710 from AP1, and may receive a second trigger frame 1720 from AP2. Then, the STA1 may generate a synchronization frame 1730 based on the first trigger frame 1710 and the second trigger frame 1720, and then transmit the synchronization frame 1730 to both AP1 and AP2. A STA2 may receive a first trigger frame 1710 from AP1, and may receive a second trigger frame 1720 from AP2. Then, STA2 may generate a synchronization frame 1740 based on the first trigger frame 1710 and the second trigger frame 1720, and then transmit the synchronization frame 1740 to both AP1 and AP2.

As shown in FIG. 17, STA1 and STA2 may transmit their own synchronization frame at the same time. The first trigger frame 1710 is similar to or the same as the first trigger frame 1510 shown in FIG. 15. The second trigger frame 1720 is similar to or the same as the second trigger frame 1520 shown in FIG. 15. The synchronization frame 1730 and the synchronization frame 1740 are similar to or the same as the synchronization 1530 shown in FIG. 15.

As shown in FIG. 17, after AP1 and AP2 receive the synchronization frame 1730 and the synchronization frame 1740, AP1 and AP2 may transmit data (i.e., Data1 and Data 2 shown in FIG. 16) respectively to STA1 and STA2. Then, STA1 may transmit ACK 1750 respectively to AP1 and AP2. STA2 may transmit ACK 1760 respectively to AP1 and AP2.

It should be noted that the STA may receive data transmissions from AP1 and AP2. In an embodiment with more than two APs, the STA may select one AP or multiple APs to send the synchronization. Accordingly, only those APs that have received the synchronization may do upcoming data transmissions. Depending on the Packet IDs in multi-AP Trigger frame, the STA may or may not combine the transmissions. The STA may transmit acknowledgement frames to the AP.

The associated STA procedure is shown in FIG. 18, where the STA receives the master trigger. The master trigger identifies the parameters of the multi-AP transmission and the number of APs and additional DL triggers to expect. STA receives the trigger information for the N−1 additional triggers. STA estimates parameters for each AP; e.g., Rx power, timing offset, and/or frequency offset. STA selects parameters for multi-AP transmission. STA calculates multi-AP transmission parameters; e.g., Tx power, time and/or frequency offset correction. STA sends a reverse trigger to the AP with suggested multi-AP transmission parameters. STA receives multi-AP transmission data. STA sends ACK to the AP.

Some implementations provide channel access for uplink coordinated SU beamforming or UL dynamic point selection.

FIG. 19 illustrates an example channel access scheme which allows multiple APs to receive from a STA concurrently. As shown in FIG. 19, AP1 transmits a trigger frame 1910 to a STA. The trigger frame 1910 is similar to or the same as the first trigger frame 1510 shown in FIG. 15. Then, the STA transmit an inverse trigger frame 1920 to both AP1 and AP2 based on the trigger frame 1910. Then, the STA transmits a Data 2 to both AP1 and AP2. After receiving the Data 2, AP1 may transmit an ACK 1930 to the STA, and AP2 may transmit an ACK 1940 to the STA. In this example, data may be addressed to both APs or to a specific AP (e.g., in the case of dynamic point selection). The target AP or APs may be addressed in the inverse trigger 1920. This example may address issues relating to UL coordinated SU beamforming or joint precoding.

In this example, a STA may transmit to multiple APs concurrently in UL. If the APs cannot receive from each other or cannot receive from the primary AP, a channel access procedure may be implemented to inform all the desired APs that the multi-AP UL transmission may be expected.

In this example, AP1 and AP2 may negotiate to perform concurrent reception from a STA. In some implementations, in the negotiation, AP1 may be considered as the primary AP and AP2 may be considered as the secondary AP. In some implementations, the AP1 and AP2 may perform multi-AP joint transmission sounding before and acquire the necessary channel state information or may enable the STA perform sounding and acquire the channel between itself and the APs. In this case, the STA may send an NDPA and NDP to the APs individually or in a joint manner and then acquire the UL channel from each AP e.g. by polling each AP or by sending an UL Trigger for the APs to send their channel information in a pre-determined manner e.g. DL Multi-AP transmission.

The channel access procedure for UL Multi-AP transmission may be triggered by one or more of the APs. In one method, AP1 and AP2 may not be able to receive from one other and the negotiation may be through a STA. In some implementations, AP1 may acquire the channel and transmit a multi-AP trigger frame to trigger a transmission from a STA. In the multi-AP trigger frame, AP1 may configure the upcoming UL multi-AP transmission in the multi-AP trigger frame. In some implementations, AP1, the primary AP, may configure the transmission from AP2 to the STA. For example, the multi-AP trigger frame may indicate STA specific information, and/or common information. STA specific information (where STA here indicates an AP STA or a non-AP STA) may indicate a STA role and/or STA ID. The STA role may indicate whether the STA is a transmitter/AP or a receiver/STA. The STA ID may be the association identifier (AID), compressed AID, BSS identifier (BSSID, compressed BSSID), BSS color, or enhanced BSS color, etc.

If the STA role indicates a transmitter/STA, it may include a packet ID. The packet ID may indicate that the packet is transmitted from the STA. In some examples, this field may be an AP/transmitter specific field. The STA may detect the packet IDs corresponding to multiple APs and determine whether a single packet is transmitted from multiple APs or multiple packets are transmitted from multiple APs. In the first case, the STA may combine the transmissions from multiple APs to decode the single packet.

If the STA role indicates a receiver/AP, it may include a resource allocation, spatial stream allocation, and/or MCS related information. A resource allocation may indicate the resources allocated to the STA to transmit the multi-AP packet to the AP. In an OFDMA transmission scenario, the resource may be allocated in units of resource unit (RU). A spatial stream allocation may indicate the starting spatial stream index and number of spatial streams used for the receiver. MCS related information may include MCS, coding scheme, whether DCM modulation is utilized etc.

Common information may include a type field. The type may indicate a UL multi-AP transmission. The type may indicate a trigger frame transmitted from an AP.

After reception of the multi-AP trigger frames from AP1, the STA may transmit an inverse Trigger frame to multiple APs. In the inverse trigger frame, the STA may indicate repeating full or partial information carried by multi-AP Trigger frame transmitted by AP1. This field may be used, for example, if AP1 and AP2 have difficulty in communicating with each other directly. In such cases, or if AP2 modifies anything in its trigger frame, the inverse trigger frame may confirm a configuration to be used in the upcoming multi-AP transmission. The confirmed configuration may be from AP1 or AP2 or a combination of AP1 and AP2.

The STA may transmit data to AP1 and AP2. In some implementations, at the end of the transmission, the STA may concatenate another inverse trigger frame to trigger the concurrent transmission of acknowledgement from the APs. In the inverse trigger frame, the STA may include synchronization information, such as power control information. The power control information may indicate the transmit power of the inverse trigger frame, and/or expected RSSI for the multi-AP data transmission. The APs may use these two fields to decide their own transmit powers. The STA may request one or more of the APs to perform a time and/or frequency correction relative to the trigger frame. The APs may transmit acknowledgement frames to the STA.

FIG. 20 illustrates an example channel access scheme which allows multiple APs to receive from a STA concurrently. As shown in FIG. 20, AP1 transmits a trigger frame 2010 to a STA. The trigger frame 2010 is similar to or the same as the first trigger frame 1510 shown in FIG. 15. Then, AP2 transmits a short trigger frame 2020 which may comprise an availability information to the STA. Then, the STA generates an inverse trigger frame 2030 based on the trigger frame 2010 and the short trigger frame 2020, and transmit the inverse trigger frame 2030 to both AP1 and AP2. Then, the STA transmits Data 2060 based on information in the inverse trigger frame 2030 to both AP1 and AP2. After receiving the Data 2, AP1 may transmit an ACK 2040 to the STA, and AP2 may transmit an ACK 2050 to the STA.

Data 2060 may be addressed to both APs or to a specific AP (e.g., in the case of dynamic point selection). The target AP or APs may be addressed in the inverse trigger.

In some examples, the APs may be able to receive from one other. A channel access scheme may be used to exchange multi-AP UL transmission information and meanwhile protect the transmission from interference from others. FIG. 20 illustrates another example channel access procedure which in some implementations may permit a STA to transmit to multiple APs concurrently.

In the example of FIG. 20, AP1 and AP2 may negotiate to perform concurrent reception from a STA. In some implementations, in the negotiation, AP1 may be considered as the primary AP and AP2 may be considered as the secondary AP. In some examples, the AP1 and AP2 may perform multi-AP joint transmission sounding in advance, and may acquire the necessary channel state information. In some implementations, AP1 and AP2 may not be able to receive from each other and the negotiation may be through a STA.

AP1 may acquire the channel and transmit a multi-AP Trigger frame to trigger a transmission from a STA. In the multi-AP Trigger frame, AP1 may configure the upcoming UL multi-AP transmission in the multi-AP Trigger frame. In one method, we may allow AP1, the primary AP to configure the transmission from AP2 to the STA. For example, the multi-AP trigger frame may indicate STA specific information, and/or common information. STA specific information (where STA here indicates an AP STA or a non-AP STA) may indicate a STA role and/or STA ID. The STA role may indicate whether the STA is a transmitter/AP or a receiver/STA. The STA ID may be the association identifier (AID), compressed AID, BSS identifier (BSSID, compressed BSSID), BSS color, or enhanced BSS color, MAC address, compressed MAC address, etc.

If the STA role may indicate a transmitter/STA, it may include a packet ID. The packet ID may be used to indicate that the packet is transmitted from the STA. In some examples, this field may be an AP/transmitter specific field. The STA may detect the packet IDs corresponding to multiple APs and determine whether a single packet is transmitted from multiple APs or multiple packets are transmitted from multiple APs. In the first case, the STA may combine the transmissions from multiple APs to decode the single packet.

If the STA role indicates a receiver/AP, it may include a resource allocation, spatial stream allocation, and/or MCS related information. A resource allocation may indicate the resources allocated to the STA to transmit the multi-AP packet to the AP. In an OFDMA transmission scenario, the resource may be allocated in units of resource unit (RU). A spatial stream allocation may indicate the starting spatial stream index and number of spatial streams used for the receiver. MCS related information may include MCS, coding scheme, whether DCM modulation is utilized etc.

Common information may include a type field. The type may indicate a UL multi-AP transmission. The type may indicate a trigger frame transmitted from an AP. Common information may include time and/or frequency correction information, e.g., where the STA may request one or more of the APs to perform a time and/or frequency correction relative to the trigger frame.

After reception of the multi-AP Trigger frame, AP2 may transmit a multi-AP trigger frame, which may be the same as the one transmitted by AP1. Alternatively, AP2 may transmit a short multi-AP trigger frame, which may carry a subset of information transmitted by AP1. In some implementations, the short multi-AP Trigger frame may be an NDP frame, which may carry the identity of AP2. The transmission from AP2 may indicate that AP2 is ready for the upcoming multi-AP transmission. In some implementations, the multi-AP trigger frame or the short multi-AP trigger frame may overwrite some information transmitted by AP1. For example, AP2 may be assigned to use channel 2 to receive from the STA, however, channel 2 may not be available for AP2, AP2 may indicate either not available or available channel list to both AP1 and STA.

After reception of the multi-AP Trigger frames from multiple APs, the STA may transmit an inverse trigger frame to multiple APs. In the inverse trigger frame, the STA may indicate repeating full or partial information carried by multi-AP trigger frame transmitted by AP1. This field may be used, for example, if AP1 and AP2 have difficulty in communicating with each other directly. In such cases, or if AP2 modifies anything in its trigger frame, the inverse trigger frame may confirm a configuration to be used in the upcoming multi-AP transmission. The confirmed configuration may be from AP1 or AP2 or a combination of AP1 and AP2.

The STA may transmit data to AP1 and AP2. In some implementations, at the end of the transmission, the STA may concatenate another inverse trigger frame to trigger the concurrent transmission of acknowledgement from the APs. In the inverse trigger frame, the STA may include synchronization information. The synchronization information may include power control information. The synchronization information may include time and/or frequency correction information. The power control information may indicate the transmit power of the inverse trigger frame, and/or expected RSSI for the multi-AP data transmission. The APs may use these two fields to decide their own transmit powers. In the time and/or frequency correction information the STA may request one or more of the APs to perform a time or frequency correction relative to the trigger frame. The APs may transmit acknowledgement frames to the STA.

Some implementations provide Transmit power and Multi-User Joint Transmission. Such examples may address issues relating to coordinated MU beamforming, where APs have different impairments and/or configurations (e.g., different transmit powers and/or EVMs).

In some implementations, to resolve the problem of inverting a JT MU-MIMO channel with a high conversion number, the power component and the effective channel may be inverted separately. In some implementations, eliminating the power effect may make the resulting matrix more invertible (e.g., have a lower condition number).

In some implementations, the inversion of the two components may be performed in the baseband. In some implementations, the power descaling or inversion may be performed in the analog domain while the inversion of the rest of the channel may be done in the baseband (e.g., a combined analog and digital baseband JT MU-MIMO).

In some implementations of a combined analog and digital baseband JT MU-MIMO, the APs may send their Tx power values to the controller and the controller may send the analog precoding power scaling values to the APs. The APs may thereafter perform power scaling and commence JP precoding procedures.

Figure 21:
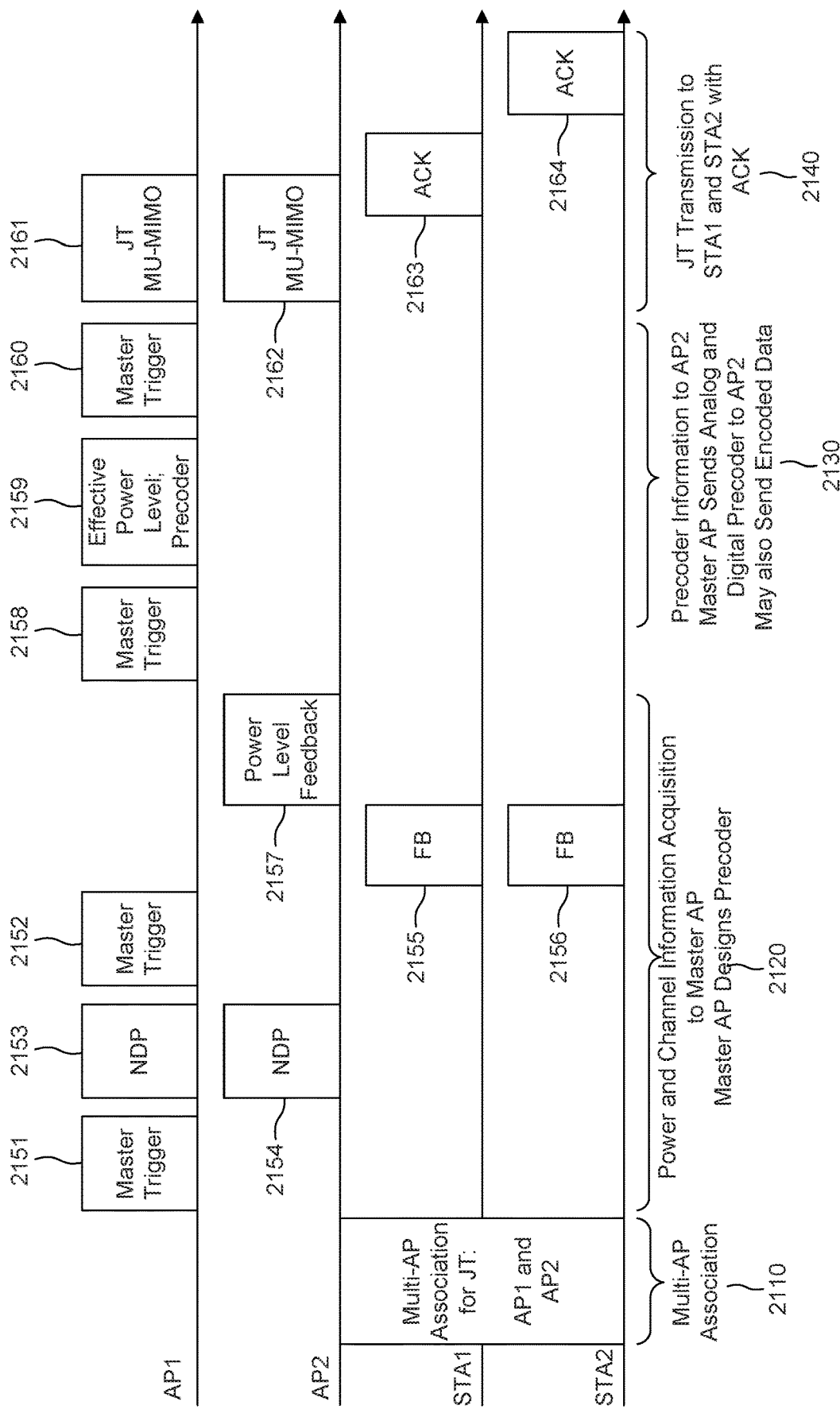
FIG. 21 illustrates an example procedure and frame exchange for an example JT MU-MIMO.
Figure 22:
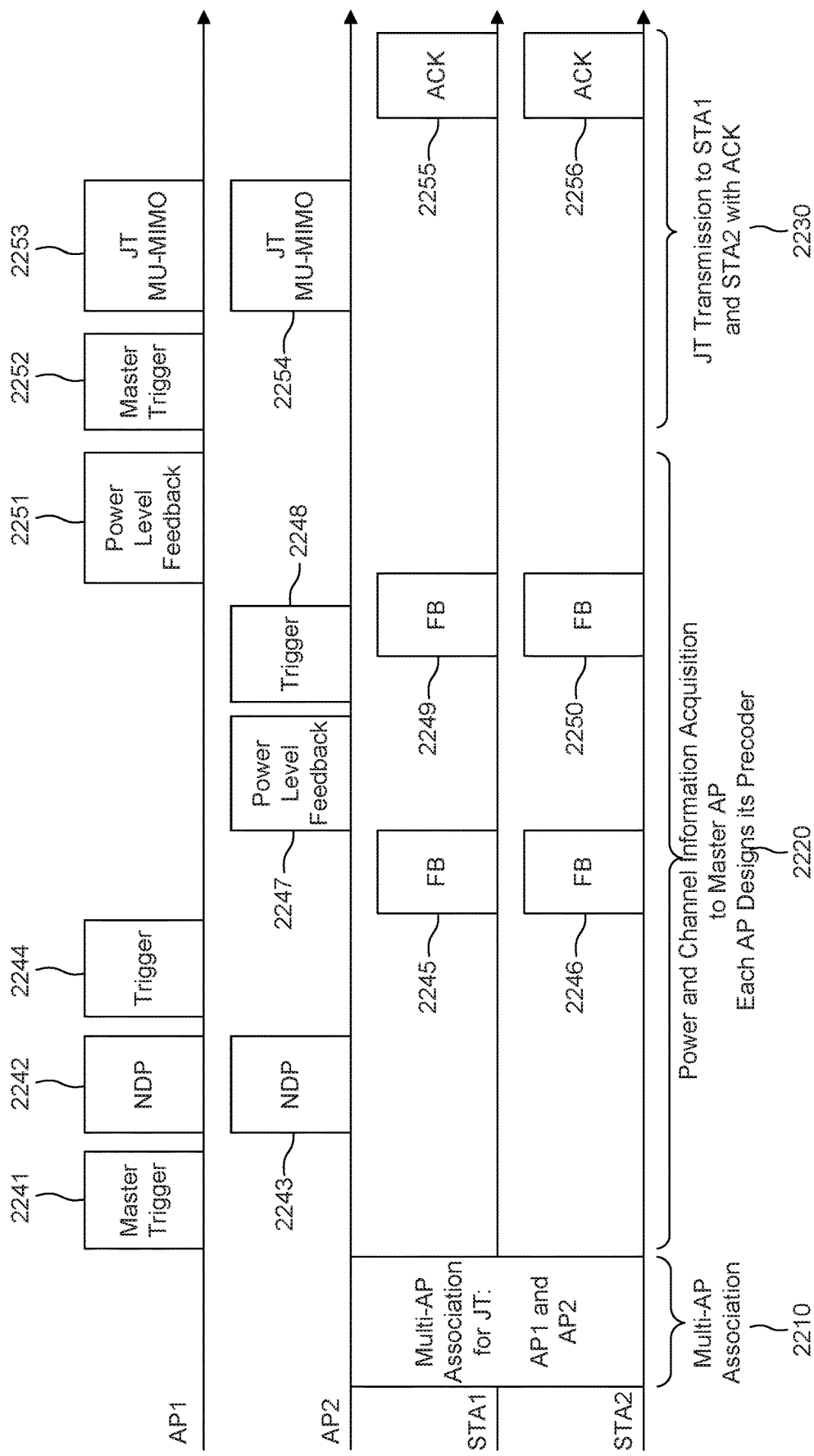
FIG. 22 illustrates an example procedure and frame exchange for an example JT MU-MIMO.
Figure 23:
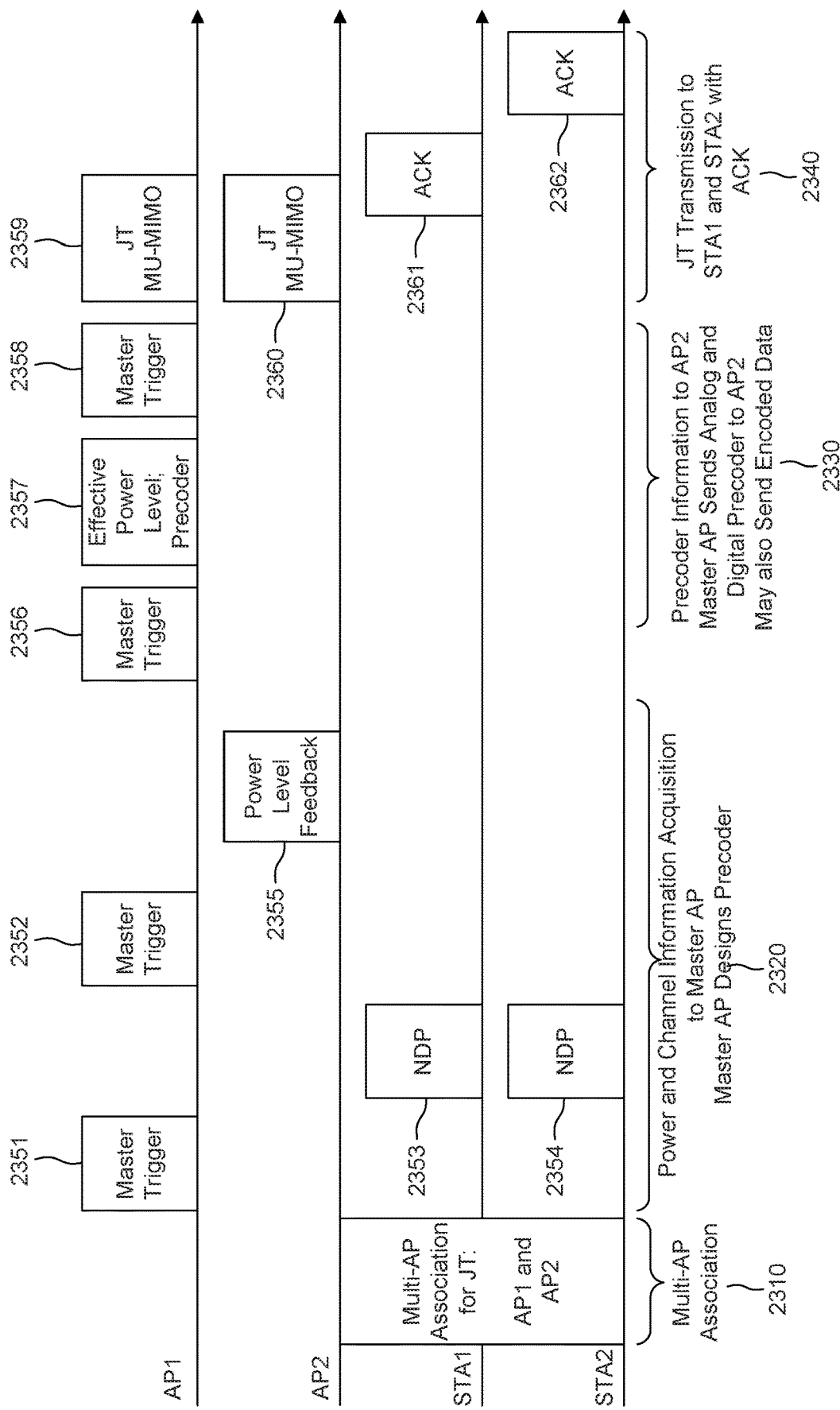
FIG. 23 illustrates an example procedure and frame exchange for an example JT MU-MIMO.
Figure 24:
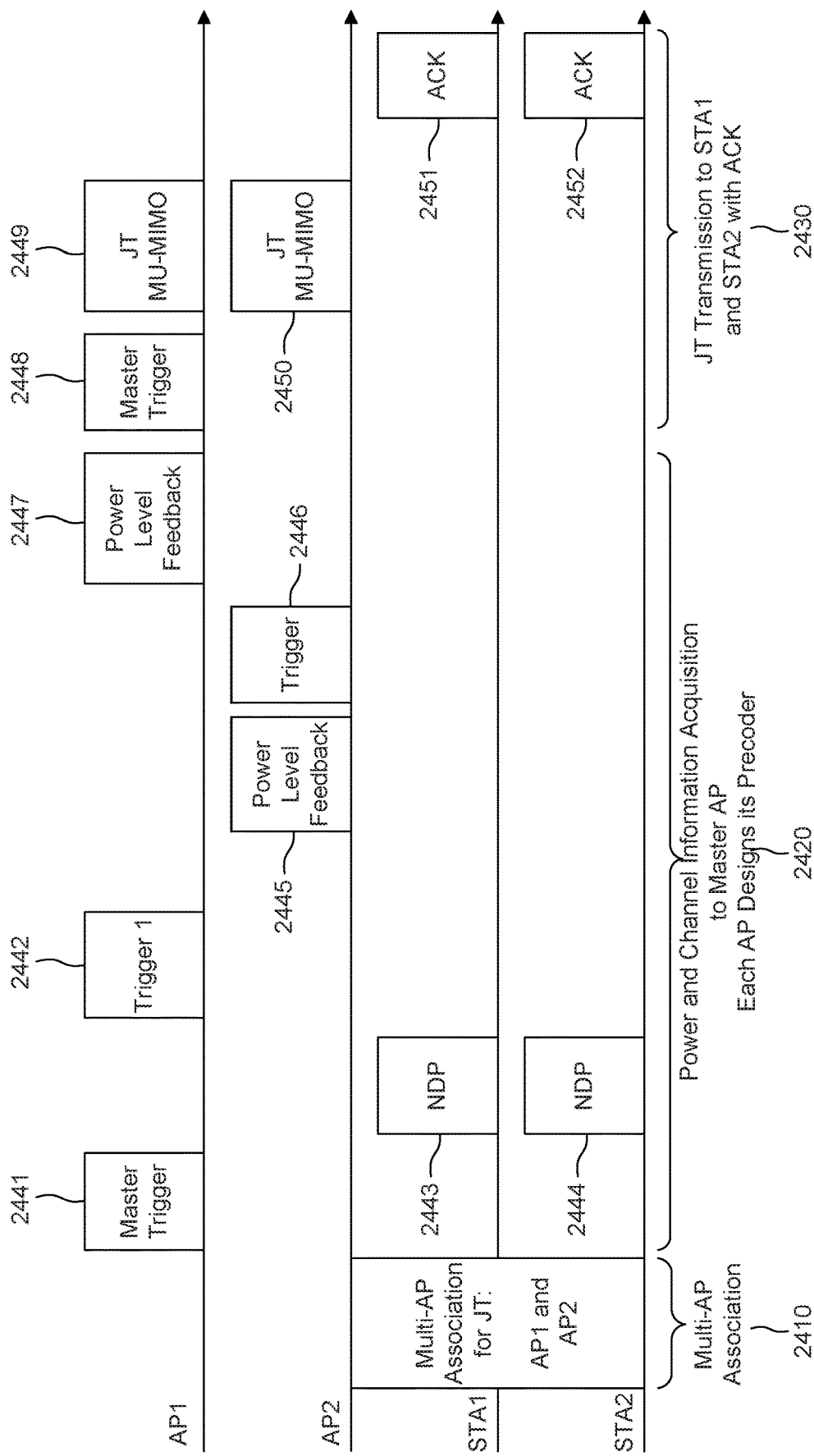
FIG. 24 illustrates an example procedure and frame exchange for an example JT MU-MIMO.

In some implementations of a combined analog and digital baseband JT MU-MIMO, the master AP may request that the slave AP report its transmit power. The master AP may thereafter send the analog power scaling value to the slave AP. FIG. 21 and FIG. 22 illustrate an example procedure and frame exchange for an example JT MU-MIMO procedure with explicit feedback. FIG. 23 and FIG. 24 illustrate an example procedure and frame exchange for an example JT MU-MIMO procedure with implicit feedback. FIG. 21 and FIG. 23 illustrate JT procedures for an unbalanced power scenario, where the master AP designs precoders. FIG. 22 and FIG. 24 illustrates JT procedures for an unbalanced power scenario, where each AP designs precoders.

In some implementations, APs and STAs coordinate to set the AP transmit power and AP precoders with the precoders designed at the master AP. In some implementations of a combined analog and digital baseband JT MU-MIMO, the APs may request for the effective JP channel, H, to be sent from the STAs. The master AP or controller may then normalize the condition number of the effective channel and send separate analog scaling and digital precoding parameters to the APs for JP transmission.

An example of such procedure may be described as having setup, channel/power acquisition, precoder information, and transmission stages. These are exemplary; the procedure may be implemented in any suitable order or combination of stages.

During an example setup phase, each STA associates with multiple APs and identifies the type of multi-AP transmission it is capable of (e.g., in this case, joint-transmission). Both APs and STAs indicate that they are capable of analog and digital processing for power imbalance. It is noted that in cases where the capability is absent, the AP/STA may elect to drop out of the multi-AP scheme and transmit/receive from a single AP/STA.

During an example channel/power acquisition stage, the APs and STA undergo a sounding procedure to identify the effective MIMO channel. This may be explicit or implicit. On acquisition of the channel, the additional APs may send the relative power information to the master AP (e.g., power level feedback).

During an example precoder information stage, the master AP may send the analog and digital precoder information to the secondary/slave APs. The analog precoder may be a full matrix precoder. The analog precoder may be or include a power adjustment precoder that normalizes the power of both APs for power balance.

During an example transmission stage, the APs transmit a JT frame to the STAs using the analog and digital precoders. These example stages are illustrated in FIG. 21, FIG. 22, FIG. 23 and FIG. 24 for explicit and implicit feedback, where FIG. 21 illustrates an example JT procedure with master AP for unbalanced power scenario, where the master AP designs the precoders (explicit feedback).

As shown in FIG. 21, those processes from 2110 to 2140 represent the example JT procedure. At 2110, each STA may associate with multiple APs and identify the type of multi-AP transmission it is capable of. For example, both APs (e.g., AP1 and AP2) and STAs (e.g., STA1 and STA2) indicate that they are capable of analog and digital processing for power imbalance. At 2120, powder and channel information may be acquired by the master AP (e.g. AP1) and AP1 may design precoder through Master Trigger 2151, NDP 2153, NDP 2154, Master Trigger 2152, FB 2155 and FB 2156. Then, AP2 may send the relative power information to AP1, i.e., Power Level Feedback 2157. At 2130, AP1 may send precoder information to AP2 through Master Trigger 2158, Effective power level Precoder 2159 and Master Trigger 2160. Then, at 2140, both APs may send a JT frame (i.e., JT MU-MIMO 2161 and JT MU-MIMO 2162) to the STAs, and the STAs may report ACK 2163 and ACK 2164 respectively to the APs.

FIG. 22 illustrates an example JT procedure with master AP for unbalanced power scenario, where each AP designs the precoders (explicit feedback). As shown in FIG. 22, those processes from 2210 to 2230 represent the example JT procedure. At 2210, each STA may associate with multiple APs and identify the type of multi-AP transmission it is capable of. For example, both APs (e.g., AP1 and AP2) and STAs (e.g., STA1 and STA2) indicate that they are capable of analog and digital processing for power imbalance. At 2220, powder and channel information may be acquired by the master AP (e.g. AP1) and each AP may design its precoder through Master Trigger 2241, NDP 2242, NDP 2243, Trigger 2244, FB 2245, FB 2246, Power Level Feedback 2247, Trigger 2248, FB 2249, FB 2250 and Power Level Feedback 2251. Then, at 2130, AP1 may send Master Triger 2252 and JT MU-MIMO 2253 to the STAs. AP2 may send JT MU-MIMO 2254 to the STAs. The STAs may report ACK 2255 and ACK 2256 respectively to the APs.

FIG. 23 illustrates an example JT procedure with master AP for unbalanced power scenario, where the master AP designs the precoders (implicit feedback). At 2310, each STA may associate with multiple APs and identify the type of multi-AP transmission it is capable of. For example, both APs (e.g., AP1 and AP2) and STAs (e.g., STA1 and STA2) indicate that they are capable of analog and digital processing for power imbalance. At 2320, powder and channel information may be acquired by the master AP (e.g. AP1)

and AP1 may design precoder through Master Trigger 2351, NDP 2353, NDP 2354, Master Trigger 2352, and Power Level Feedback 2355. Then, at 2330, AP1 may send precoder information to AP2 through Master Trigger 2356, Effective power level Precoder 2357 and Master Trigger 2358. Then, at 2340, both APs may send a JT frame (i.e., JT MU-MIMO 2359 and JT MU-MIMO 2360) to the STAs, and the STAs may report ACK 2361 and ACK 2262 respectively to the APs.

FIG. 24 illustrates an example JT procedure with master AP for unbalanced power scenario, where each AP designs the precoders (implicit feedback). At 2410, each STA may associate with multiple APs and identify the type of multi-AP transmission it is capable of. For example, both APs (e.g., AP1 and AP2) and STAs (e.g., STA1 and STA2) indicate that they are capable of analog and digital processing for power imbalance. At 2420, powder and channel information may be acquired by the master AP (e.g. AP1) and each AP may design its precoder through Master Trigger 2441, Trigger 2442, NDP 2443, NDP 2444, Power Level Feedback 2245, Trigger 2246 and Power Level Feedback 2247. Then, at 2430, AP1 may send Master Triger 2448 and JT MU-MIMO 2449 to the STAs. AP2 may send JT MU-MIMO 2450 to the STAs. The STAs may report ACK 2451 and ACK 2452 respectively to the APs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of multi-access point (multi-AP) communication performed by a wireless transmit/receive unit (WTRU), the method comprising:
receiving a first trigger frame from a first access point (AP) of a plurality of APs, the first trigger frame comprising first information;
receiving a second trigger frame from a second AP of the plurality of APs at a predetermined time duration after receiving the first trigger frame, the second trigger frame also comprising the first information of the first trigger frame;
generating a synchronization frame based on the first trigger frame and the second trigger frame, the synchronization frame comprising synchronization information;
transmitting the synchronization frame to at least the first AP and the second AP; and
receiving a data transmission based on the synchronization information from each of the first AP and the second AP.

2. The method of claim 1, wherein the synchronization information comprises transmission power information, transmission starting time information, or transmission frequency information.

3. The method of claim 1, wherein the second trigger frame further comprises configuration information for a second data transmission, wherein the configuration information is different from second information of the first trigger frame.

4. The method of claim 3, wherein the synchronization frame further comprises confirmation information corresponding to the configuration information.

5. The method of claim 1, wherein the synchronization frame further comprises third information of the first trigger frame.

6. The method of claim 1, further comprising: transmitting an ACK/NACK report to each of the first AP and the second AP.

7. The method of claim 1, wherein the first trigger frame comprises WTRU-related information.

8. The method of claim 7, wherein the WTRU-related information comprises a packet ID, a resource allocation, a spatial stream allocation, or modulation and coding scheme (MCS) related information.

9. A wireless transmit/receive unit (WTRU) configured to perform a multi-access point (multi-AP) communication, the WTRU comprising:
a receiver configured to receive a first trigger frame from a first access point (AP) of a plurality of APs, the first trigger frame comprising first information, and a second trigger frame from a second AP of the plurality of APs at a predetermined time duration after receiving the first trigger frame, the second trigger frame also comprising the first information of the first trigger frame;
a processor configured to generate a synchronization frame based on the first trigger frame and the second trigger frame, the synchronization frame comprising synchronization information; and
a transmitter configured to transmit the synchronization frame to at least the first AP and the second AP;
wherein the receiver is further configured to receive a data transmission based on the synchronization information from each of the first AP and the second AP.

10. The WTRU of claim 9, wherein the synchronization information comprises transmission power information, transmission starting time information, or transmission frequency information.

11. The WTRU of claim 9, wherein the second trigger frame further comprises configuration information for a second data transmission, wherein the configuration information is different from second information of the first trigger frame.

12. The WTRU of claim 11, wherein the synchronization frame further comprises confirmation information corresponding to the configuration information.

13. The WTRU of claim 9, wherein the synchronization frame further comprises third information of the first trigger frame.

14. The WTRU of claim 9, the transmitter is further configured to transmit an ACK/NACK report to each of the first AP and the second AP.

15. The WTRU of claim 9, wherein the first trigger frame comprises WTRU-related information.

16. The WTRU of claim 15, wherein the WTRU-related information comprises a packet ID, a resource allocation, a spatial stream allocation, or modulation and coding scheme (MCS) related information.

* * * * *